(12) United States Patent
Coelho et al.

(10) Patent No.: US 11,310,498 B2
(45) Date of Patent: *Apr. 19, 2022

(54) RECEPTIVE-FIELD-CONFORMING CONVOLUTIONAL MODELS FOR VIDEO CODING

(71) Applicant: GOOGLE LLC, Mountain View, CA (US)

(72) Inventors: Claudionor Coelho, Redwood City, CA (US); Aki Kuusela, Palo Alto, CA (US); Shan Li, Fremont, CA (US); Dake He, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,591

(22) Filed: Nov. 2, 2020

(65) Prior Publication Data

US 2021/0051322 A1  Feb. 18, 2021

Related U.S. Application Data

(63) Continuation of application No. 16/134,165, filed on Sep. 18, 2018, now Pat. No. 10,869,036.

(51) Int. Cl.
*H04N 19/119* (2014.01)
*H04N 19/19* (2014.01)
(Continued)

(52) U.S. Cl.
CPC ......... *H04N 19/119* (2014.11); *H04N 19/147* (2014.11); *H04N 19/176* (2014.11); *H04N 19/19* (2014.11)

(58) Field of Classification Search
CPC .. H04N 19/119; H04N 19/147; H04N 19/176; H04N 19/19
(Continued)

(56) References Cited

U.S. PATENT DOCUMENTS 5,568,414 A 10/1996 Murai
7,788,196 B2 8/2010 Buscema
(Continued)

FOREIGN PATENT DOCUMENTS

CN 105791826 A 7/2016
KR 20170059040 A 5/2017

OTHER PUBLICATIONS

Maixu et al: "Reducing Complexity of HEVC: A Deep Learning Approach", IEEE Transactions on Image Processing., vol. 27, No. 10, Mar. 22, 2018 (Mar. 22, 2018), pp. 5044-5059, XP055647622, US ISSN:1057-7149, DOI: 10.1109 /TIP.2018.2847035 (Year: 2018).*

(Continued)

*Primary Examiner* — Amir Shahnami
(74) *Attorney, Agent, or Firm* — Young Basile Hanlon & MacFarlane, P.C.

(57) ABSTRACT

An apparatus for encoding a block of a picture includes a convolutional neural network (CNN) for determining a block partitioning of the block, the block having an N×N size and a smallest partition determined by the CNN being of size S×S. The CNN includes feature extraction layers; a concatenation layer that receives, from the feature extraction layers, first feature maps of the block, where each first feature map of the first feature maps is of the smallest possible partition size S×S of the block; and at least one classifier that is configured to infer partition decisions for sub-blocks of size (αS)×(αS) of the block, where α is a power of 2.

20 Claims, 16 Drawing Sheets

(51) Int. Cl.
   *H04N 19/147* (2014.01)
   *H04N 19/176* (2014.01)
(58) Field of Classification Search
   USPC .................................................. 375/240.02
   See application file for complete search history.

(56) References Cited

U.S. PATENT DOCUMENTS

| | | | |
|---|---|---|---|
| 9,615,401 | B2 | 4/2017 | Geng et al. |
| 9,807,416 | B2 | 10/2017 | Kuusela |
| 10,489,703 | B2 | 11/2019 | Yang et al. |
| 2006/0140401 | A1 | 6/2006 | Johnson et al. |
| 2009/0010557 | A1 | 1/2009 | Zheng et al. |
| 2010/0002764 | A1 | 1/2010 | Lie et al. |
| 2012/0173527 | A1 | 7/2012 | Thiesson et al. |
| 2013/0128963 | A1 | 5/2013 | Leontaris et al. |
| 2016/0065959 | A1 | 3/2016 | Stobaugh et al. |
| 2017/0085915 | A1 | 3/2017 | Kuusela |
| 2017/0140253 | A1 | 5/2017 | Wshah et al. |
| 2017/0231550 | A1 | 8/2017 | Do et al. |
| 2017/0278289 | A1 | 9/2017 | Marino et al. |
| 2018/0098062 | A1 | 4/2018 | Li et al. |
| 2018/0139450 | A1 | 5/2018 | Gao et al. |
| 2018/0227585 | A1 | 8/2018 | Wang et al. |
| 2018/0253622 | A1 | 9/2018 | Chen et al. |
| 2018/0322606 | A1 | 11/2018 | Das et al. |
| 2018/0350110 | A1* | 12/2018 | Cho ..................... G06N 3/04 |
| 2019/0035431 | A1 | 1/2019 | Attorre et al. |
| 2019/0147332 | A1 | 5/2019 | Lagudu et al. |
| 2019/0244394 | A1 | 8/2019 | Gueguen et al. |
| 2019/0361456 | A1* | 11/2019 | Zeng ..................... G01C 21/20 |
| 2020/0042860 | A1 | 2/2020 | Sun et al. |
| 2020/0213587 | A1 | 7/2020 | Galpin et al. |
| 2020/0244997 | A1 | 7/2020 | Galpin et al. |

OTHER PUBLICATIONS

Jin et al., "Fast QTBT Partition Algorithm for Intra Frame Coding through Convolutional Neural Network", IEEE Access vol. 6, 2018, pp. 54660-54673 (Year: 2018).*
Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video. Advanced video coding for generic audiovisual services, International Telecommunication Union, Version 11, Mar. 2009. 670 pp.
Series H: Audiovisual and Multimedia Systems, Infrastructure of audiovisual services—Coding of moving video. Advanced video coding for generic audiovisual services, International Telecommunication Union, Version 12, Mar. 2010, 676 pp.
Series H: Audiovisual and Multimedia Systems, Infrastructure of audiovisual services—Coding of moving video. Amendment 2: New profiles for professional applications, International Telecommunication Union, Apr. 2007, 75 pp.
Series H: Audiovisual and Multimedia Systems, Infrastructure of audiovisual services—Coding of moving video. Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video. Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video. Advanced video coding for generic audiovisual services, Version 1, International Telecommunication Union, May 2003, 282 pp.
Series H: Audiovisual and Multimedia Systems, Infrastructure of audiovisual services—Coding of moving video. Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
Duanmu, Fanyi et al., "Fast CU Partition Decision Using Machine Learning for Screen Content Compression", New York University; 2015; 5 Pages.
He, Jing et al.; "Fast HEVC Coding Unit Decision Based on BP-Neutral Network" International Journal of Grid Distribution Computing vol. 8, No. 4, (2015), pp. 289-300.
T. Wiegand, H. Schwarz, A. Joch, F. Kossentini, G. J. Sullivan, "Rate-constrained coder control and comparison of video coding standards", IEEE Trans. Circuits Syst. Video Technol., v. 13, Jul. 2003.
Xu, M, et al, "Reducing Complexity of HEVC: A Deep Learning Approach", (<https://arxiv.org/abs/1710.01218>); Mar. 2018.
Zhang, Y, et al, "Machine Learning-Based Coding Unit Depth Decisions for Flexible Complexity Allocation in High Efficiency Video Coding", IEEE Transactions on Image Processing, vol. 24, No. 7, Jul. 201(<https://drive.google.com/open?id=1-cs Hxd6yrJ9K4GIFqXelKMFn3Dzyzeyw>).
Zhenyu, L, et al, "CU Partition Mode Decision for HEVC Hard-wired Intra Encoder Using Convolution Neural Network", IEEE Transactions on Image Processing, vol. 25, No. 11, Nov. 2016 (<https://drive.google.com/open?id=1QIJG7xJiNkz81Dcw 4a6qQTmLV6MRIEAH>).
Li, T, et al, "A deep convolutional neural network approach for complexity reduction on intra-mode HEVC," Proceedings of the IEEE International Conference on Multimedia and Expo (ICME) 2017, (<http://ieeexplore.ieee.org/stamp/stamp.jsp?tp=&arnumber= 8019316>).
Springenberg, J. T., et al, "Striving for Simplicity: the all Convolutional Net," (<https://arxiv.org/pdf/1412.6806.pdf>).
Howard, Andrew G., et al.; "MobileNets: Efficient Convolutional Neural Networks for Mobile Vision Applications" https://arxiv.org/abs/1704.04861; Apr. 17, 2017.
Duanmu et al; "Fast CU Partition Decision Using Machine Learning for Screen Content Compression"; IEEE International Conference on Image Processing; 2015; pp. 1-5.
He et al.; "Fast HEVC Coding Unit Decision Based on BP-Neural Network"; International Journal of Grid Distribution Computing vol. 8, No. 4, (2015), pp. 289-300.
Wiegand, et al, "Rate-constrained coder control and comparison of video coding standards", IEEE Trans. Circuits Syst. Video Technol., v. 13, Jul. 2003.
Xu, M, et al, "Reducing Complexity of HEVC: A Deep Learning Approach", 2017;<https://arxiv.org/abs/1710.01218>.
Dumoulin et al., "A guide to convolution arithmetic for deep learning", 2016.<https://arxiv.org/abs/1603.07285>.
Dang Ha The Hien, "A guide to receptive field arithmetic for Convolutional Neural Networks", 2017. <https://medium.com/mlreview/a-guide-to-receptive-field-arithmetic-for-convolutional-neural-networks-e0f514068807>.
Springenberg et al., "Striving for simplicity: the all convolutional net", ICLR, 2015.
Redmon et al., "You Only Look Once: Unified, Real-Time Object Detection" 2016. <https://arxiv.org/pdf/1506.02640.pdf>.

(56) References Cited

OTHER PUBLICATIONS

Galpin et al; "AHG9: CNN-Based Driving of Block Partitioning for Intra Slices Encoding"; JVEI Meeting; Apr. 3, 2018 http://phenix.int-evry.fr/jvet; pp. 1, 3.

Liu Zhenyu et al; "CU Partition Mode Decision for HEVC Hardwired Intra Encoder Using Convolution Neural Netword" IEEE Transactions on Image Processing IEEE Service Center, vol. 25, No. 11; Nov. 1, 2016; pp. 5088-5103.

Zhang Yun et al; Machine Learning-Based Coding Unit Depth Decisions for Flexible Complexity Allocation in High Efficiency Video Coding: IEEE Transactions on Image Processing, IEEE Service Center, vol. 24, No. 7; Jul. 1, 2015; pp. 2230-2231.

Perez et al; "Genetic Selection of Non-Linear Product Terms in the Inputs to a Linear Classifier for Handwritten Digit Recognition"; IEEE International Conference on Systems, Man and Cybernetics; vol. 4; Oct. 7, 2001; p. 2339.

International Search Report and Written Opinion of International Application No. PCT/US2019/051453; dated Dec. 4, 2019; 15 pages.

International Search Report and Written Opinion of International Application No. PCT/US2019/051458; dated Dec. 13, 2019; 15 pages.

Meng Xiandong et al: Filter Based on Multi-channel Long-Short-Term Dependency Residual Networks 2018 Data Compression Conference, IEEE, Mar. 27, 2018, pp. 187-196.

Feng Zeqi et al: Based CTU Depth Range Prediction, 2018 IEEE 3rd International Conference on Image, Vision and Computing (ICIVC), IEEE, Jun. 27, 2018, pp. 551-555.

Dertat; "Applied Deep Learning—Part 4: Convolution Neural Networks", https://towardsdatascience.com/applied-deep-learning-part-4-convolutional-neural-networks584bc134c1e2, Nov. 8, 2017.

\* cited by examiner

RECEPTIVE-FIELD-CONFORMING CONVOLUTIONAL MODELS FOR VIDEO CODING

CROSS REFERENCE TO RELATED APPLICATIONS

This application is a continuation of U.S. application patent Ser. No. 16/134,165, filed Sep. 18, 2018, the entire disclosure of which is hereby incorporated by reference.

BACKGROUND

Digital video streams may represent video using a sequence of frames or still images. Digital video can be used for various applications, including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

Over the years, the coding efficiency of video encoders has improved. Coding efficiency can mean encoding a video at the lowest possible bit rate while minimizing distortion (i.e., while maintaining a certain level of video quality). However, the improved coding efficiency has resulted in increased computational complexity. That is, more computation time is required by an encoder to achieve the improved coding efficiency. As such, it is desirable to obtain improved coding efficiencies with less computation time (i.e., reduced computational complexity).

SUMMARY

A first aspect is an apparatus for encoding a block of a picture. The apparatus includes a convolutional neural network (CNN) for determining a block partitioning of the block, the block having an N×N size and a smallest partition determined by the CNN being of size S×S. The CNN includes feature extraction layers; a concatenation layer that receives, from the feature extraction layers, first feature maps of the block, where each first feature map of the first feature maps is of the smallest possible partition size S×S of the block; and at least one classifier that is configured to infer partition decisions for sub-blocks of size ($\alpha$S)×($\alpha$S) of the block, where $\alpha$ is a power of 2.

A second aspect is a method of encoding a block. The method includes obtaining, using a convolutional neural network (CNN), partition decisions for sub-blocks of size ($\alpha$S)×($\alpha$S) of the block, by steps including obtaining first feature maps from feature extraction layers of the CNN; inputting the first feature maps to a concatenation layer of the CNN, where each first feature map of the first feature maps is of a smallest possible partition size S×S of the block; and obtaining the partition decisions from classifiers of the CNN, where each classifier of the classifiers infers partition decisions for sub-blocks of size ($\alpha$S)×($\alpha$S) of the block for a respective value of $\alpha$, where $\alpha$ is a power of 2. The method further includes encoding the block in a compressed bitstream according to the partition decisions.

A third aspect is an apparatus for decoding a block. The apparatus includes a processor that is configured to decode, from a compressed bitstream, partition decisions for the block and decode the block according to the partition decisions. The partition decisions are such that an encoder encoded the partition decisions in the compressed bitstream using a convolutional neural network (CNN) that inferred the partition decisions. To obtain the partition decisions, the encoder performs the steps of obtaining, using the CNN, the partition decisions for sub-blocks of size ($\alpha$S)×($\alpha$S) of the block, by steps including obtaining feature maps from feature extraction layers of the CNN; inputting the feature maps to a concatenation layer of the CNN, where each feature map of the feature maps is of a smallest possible partition size S×S of the block; and obtaining the partition decisions from classifiers of the CNN, where each classifier of the classifiers infers partition decisions for sub-blocks of size ($\alpha$S)×($\alpha$S) of the block for a respective value of $\alpha$, where $\alpha$ is a power of 2.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
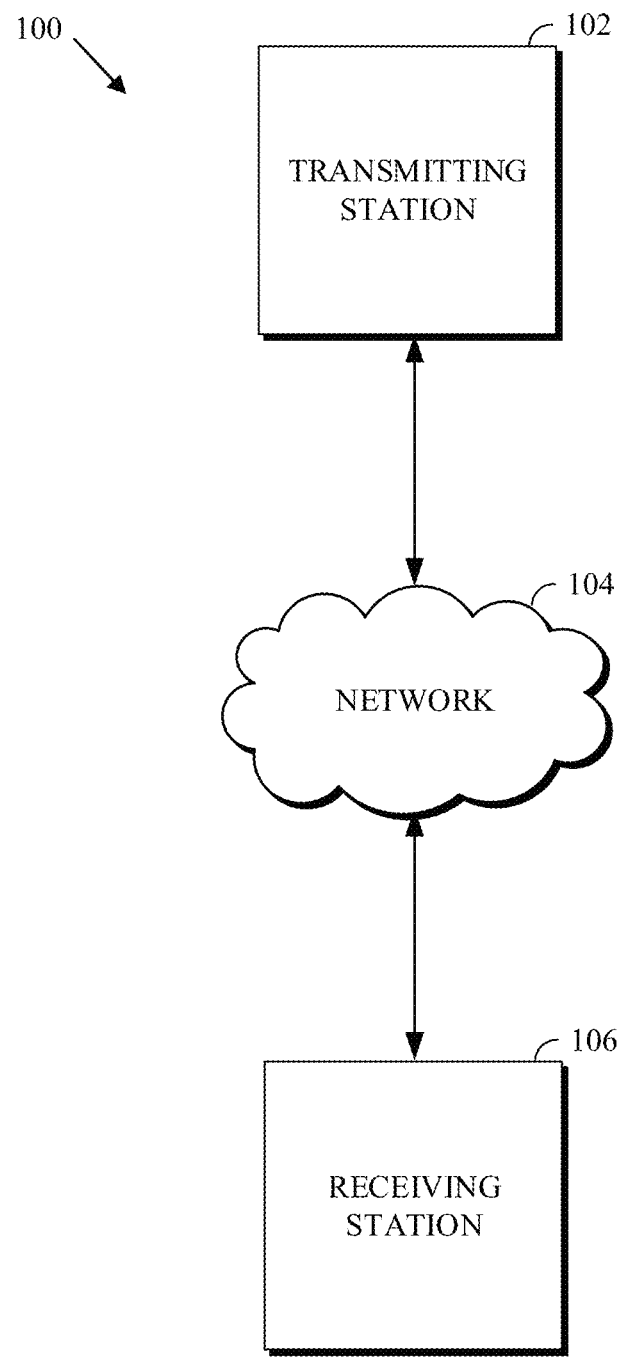
FIG. 1 is a schematic of a video encoding and decoding system.

Modern video codecs (e.g., H.264, which is also known as MPEG-4 AVC; VP9; H.265, which is also known as HEVC;

AVS2; and AV1) define and use a large number of tools and configurations that are used to improve coding efficiency. Coding efficiency is typically measured in terms of both rate and distortion. Rate refers to the number of bits required for encoding (such as encoding a block, a frame, etc.). Distortion measures the quality loss between, for example, a source video block and a reconstructed version of source video block. By performing a rate-distortion optimization (RDO) process, a video codec optimizes the amount of distortion against the rate required to encode the video.

To determine an optimal combination of tools and configurations (e.g., parameters) to be used, a video encoder can use a mode decision process. The mode decision process can examine (e.g., test, evaluate, etc.) at least some of the valid combinations of tools. In an example, all possible combinations are examined.

Assume that a first combination of parameters results in a first rate (e.g., rate=100) and a first distortion (e.g., distortion=90) and that a second combination of parameters results in a second rate (e.g., rate=120) and a second distortion (e.g., distortion=80). A procedure (e.g., a technique, etc.) is required to evaluate which of the first combination and the second combination is the better combination of parameters. To evaluate whether one combination is better than another, a metric can be computed for each of the examined combinations and the respective metrics compared. In an example, the metric can combine the rate and distortion to produce one single scalar value, as described below. In this disclosure, the rate-distortion cost is used as such as scalar value.

An example of a mode decision process is an intra-prediction mode decision process, which determines the best intra-prediction mode for coding a coding block. In the HEVC encoder, for example, 35 intra-prediction modes are possible for blocks that are larger than 4×4. Each of the intra-prediction modes dictates how a respective prediction block is determined. The mode decision process, in this context, may determine a respective prediction block for each of the intra-prediction modes and select the intra-prediction mode corresponding to the smallest rate-distortion cost. Said another way, the mode decision process selects the intra-prediction mode that provides the best rate-distortion performance.

Another example of a mode decision process is a partition decision process, which determines an optimal sub-partitioning of a superblock (also known as a coding tree unit or CTU). A partition decision process is described below with respect to FIG. 7.

Quantization parameters in video codecs can be used to control the tradeoff between rate and distortion. Usually, a larger quantization parameter means higher quantization (such as of transform coefficients) resulting in a lower rate but higher distortion; and a smaller quantization parameter means lower quantization resulting in a higher rate but a lower distortion. The variables QP, q, and Q may be used interchangeably in this disclosure to refer to a quantization parameter.

The value of the quantization parameter can be fixed. For example, an encoder can use one quantization parameter value to encode all frames and/or all blocks of a video. In other examples, the quantization parameter can change, for example, from frame to frame. For example, in the case of a video conference application, the encoder can change the quantization parameter value based on fluctuations in network bandwidth.

As the quantization parameter can be used to control the tradeoff between rate and distortion, the quantization parameter can be used to calculate the metrics associated with each combination of parameters. As mentioned above, the metric can combine the rate and the distortion values of a combination of encoding parameters.

As mentioned above, the metric can be the rate-distortion (RD) cost. The combination resulting in the lowest cost (e.g., lowest RD cost) can be used for encoding, for example, a block or a frame in a compressed bitstream. The RD costs are computed using a quantization parameter. More generally, whenever an encoder decision (e.g., a mode decision) is based on the RD cost, the QP value may be used by the encoder to determine the RD cost. An example of estimating, such as by a typical encoder, the rate and distortion cost of coding an image block X by using a prediction mode $m_i$ is described with respect to FIGS. 8-9.

In an example, the QP can be used to derive a multiplier that is used to combine the rate and distortion values into one metric. Some codecs may refer to the multiplier as the Lagrange multiplier (denoted $\lambda_{mode}$); other codecs may use a similar multiplier that is referred as rdmult. Each codec may have a different method of calculating the multiplier. Unless the context makes clear, the multiplier is referred to herein, regardless of the codec, as the Lagrange multiplier or Lagrange parameter.

To reiterate, the Lagrange multiplier can be used to evaluate the RD costs of competing modes (i.e., competing combinations of parameters). Specifically, let $r_m$ denote the rate (in bits) resulting from using a mode m and let $d_m$ denote the resulting distortion. The rate distortion cost of selecting the mode m can be computed as a scalar value: $d_m + \lambda_{mode} r_m$. By using the Lagrange parameter $\lambda_{mode}$, it is then possible to compare the cost of two modes and select one with the lower combined RD cost. This technique of evaluating rate distortion cost is a basis of mode decision processes in at least some video codecs.

Different video codecs may use different techniques to compute the Lagrange multipliers from the quantization parameters. This is due in part to the fact that the different codecs may have different meanings (e.g., definitions, semantics, etc.) for, and method of use of, quantization parameters.

Codecs (referred to herein as H.264 codecs) that implement the H.264 standard may derive the Lagrange multiplier $\lambda_{mode}$ using formula (1):

$$\lambda_{mode} = 0.85 \times 2^{(QP-12)/3} \quad (1)$$

Codecs (referred to herein as HEVC codecs) that implement the HEVC standard may use a formula that is similar to the formula (1). Codecs (referred to herein as H.263 codecs) that implement the H.263 standard may derive the Lagrange multipliers $\lambda_{mode}$ using formula (2):

$$\lambda_{mode} = 0.85 \cdot Q_{H263}^2 \quad (2)$$

Codecs (referred to herein as VP9 codecs) that implement the VP9 standard may derive the multiplier rdmult using formula (3):

$$rdmult = 88 \cdot q^2/24 \quad (3)$$

Codecs (referred to herein as AV1 codecs) that implement the AV1 standard may derive the Lagrange multiplier $\lambda_{mode}$ using formula (4):

$$\lambda_{mode} = 0.12 \cdot Q_{AV1}^2/256 \quad (4)$$

As can be seen in the above cases, the multiplier has a non-linear relationship to the quantization parameter. In the cases of HEVC and H.264, the multiplier has an exponential relationship to the QP; and in the cases of H.263, VP9, and AV1, the multiplier has a quadratic relationship to the QP. Note that the multipliers may undergo further changes before being used in the respective codecs to account for additional side information included in a compressed bitstream by the encoder. Examples of side information include picture type (e.g., intra vs. inter predicted frame), color components (e.g., luminance or chrominance), and/or region of interest. In an example, such additional changes can be linear changes to the multipliers.

As mentioned above, the best mode can be selected from many possible combinations. As the number of possible tools and parameters increases, the number of combinations also increases, which, in turn, increases the time required to determine the best mode. For example, the AV1 codec includes roughly 160 additional tools over the AV1 codec, thereby resulting in a significant increase in search time for the best mode.

Accordingly, techniques, such as machine learning, may be exploited to reduce the time required to determine the best mode. Machine learning can be well suited to address the computational complexity problem in video coding.

A vast amount of training data can be generated, for example, by using the brute-force approaches to mode decision. That is, the training data can be obtained by an encoder performing standard encoding techniques, such as those described with respect to FIGS. 4 and 6-9. Specifically, the brute-force, on-the-fly mode decision process may be replaced with the trained machine-learning model, which can infer a mode decision for use for a large class of video data input. A well-trained machine-learning model can be expected to closely match the brute-force approach in coding efficiency but at a significantly lower computational cost or with a regular or dataflow-oriented computational cost.

The training data can be used, during the learning phase of machine learning, to derive (e.g., learn, infer, etc.) a machine-learning model that is (e.g., defines, constitutes) a mapping from the input data to an output that constitutes a mode decision. Accordingly, the machine-learning model can be used to replace the brute-force, computation heavy encoding processes (such as those described with respect to FIGS. 4 and 6-9), thereby reducing the computation complexity in mode decision.

The predictive capabilities (i.e., accuracy) of a machine-learning model are as good as the inputs used to train the machine-learning model and the inputs presented to the machine-learning model to predict a result (e.g., the best mode). As such, when machine learning is used for video encoding, it is critical that the correct set of inputs and the correct (e.g., appropriate, optimal, etc.) forms of such inputs are used. Once a machine-learning model is trained, the model computes the output as a deterministic function of its input. As such, it can be critical to use the correct input(s) and appropriate forms of the inputs to the machine-learning model. In an example, the machine-learning model can be a neural-network model, such as a convolutional neural-network model. However, presenting the correct inputs and optimal forms of such inputs, as described in this disclosure, is applicable to any machine-learning technique.

The well-known universal approximation theorem of information theory states that a feed-forward neural network can be used to approximate any continuous function on a compact subset of the n-dimensional real coordinate space $R^n$. It is noted that the intrinsic linear nature of existing neural networks implies that a smaller network or shorter learning time may be achieved if a neural network is tasked (i.e., trained) to approximate (e.g., map, solve, infer) a linear function (e.g., mapping) than a non-linear function. It is also noted that the mapping of video blocks to mode decisions can be characterized as a continuous function.

The universal approximation theorem does not characterize feasibility or time and space complexity of the learning phase. That is, while a neural network may be theoretically capable of approximating the non-linear function, an unreasonably large (e.g., in terms of the number of nodes and/or layers) network and/or an unreasonably long training time may be required for the neural network to learn to approximate, using linear functions, the non-linear function. For practical purposes, the unreasonable size and time required may render the learning infeasible.

Given the above, if the quantization parameter (i.e., the value of the QP) itself is used as an input to a machine-learning system, a disconnect may result between how the QP is used in evaluating the RD cost and how the QP is used in training machine-learning models.

As described above, the mappings from quantization parameters to Lagrange multipliers in many modern video codecs are nonlinear. Namely, the mapping is quadratic in H.263, VP9, and AV1; and exponential in H.264 and HEVC. As such, better performance can be achieved by using non-linear (e.g., exponential, quadratic, etc.) forms of the QPs as input to machine-learning models as compared to using linear (e.g., scalar) forms of the QPs. Better performance can mean smaller network size and/or better inference performance.

The efficient use of quantization parameters as input to machine-learning models designed for video coding is described in this disclosure. Implementations according to this disclosure can significantly reduce the computational complexity of the mode decision processes of video encoders while maintaining the coding efficiencies of brute-force techniques. Additionally, implementations according to this disclosure can improve the inference performance of machine-learning models as compared to machine-learning models that use QP (i.e., a linear value of QP) as input to the training and inferencing phases of machine learning.

In addition to using the correct inputs and/or the correct forms of inputs to the machine-learning model, the architecture of the machine-learning model can also be critical to the performance and/or predictable capability of the machine-learning model.

At a high level, and without loss of generality, a typical machine-learning model, such as a classification deep-learning model, includes two main portions: a feature-extraction portion and a classification portion. The feature-extraction portion detects features of the model. The classification portion attempts to classify the detected features into a desired response. Each of the portions can include one or more layers and/or one or more operations.

As mentioned above, a CNN is an example of a machine-learning model. In a CNN, the feature extraction portion typically includes a set of convolutional operations, which is typically a series of filters that are used to filter an input image based on a filter (typically a square of size k, without loss of generality). For example, and in the context of machine vision, these filters can be used to find features in an input image. The features can include, for example, edges, corners, endpoints, and so on. As the number of stacked convolutional operations increases, later convolutional operations can find higher-level features.

In a CNN, the classification portion is typically a set of fully connected layers. The fully connected layers can be thought of as looking at all the input features of an image in order to generate a high-level classifier. Several stages (e.g., a series) of high-level classifiers eventually generate the desired classification output.

As mentioned, a typical CNN network is composed of a number of convolutional operations (e.g., the feature-extraction portion) followed by a number of fully connected layers. The number of operations of each type and their respective sizes is typically determined during the training phase of the machine learning. As a person skilled in the art recognizes, additional layers and/or operations can be included in each portion. For example, combinations of Pooling, MaxPooling, Dropout, Activation, Normalization, BatchNormalization, and other operations can be grouped with convolution operations (i.e., in the features-extraction portion) and/or the fully connected operation (i.e., in the classification portion). The fully connected layers may be referred to as Dense operations. As a person skilled in the art recognizes, a convolution operation can use a SeparableConvolution2D or Convolution2D operation.

As used in this disclosure, a convolution layer can be a group of operations starting with a Convolution2D or SeparableConvolution2D operation followed by zero or more operations (e.g., Pooling, Dropout, Activation, Normalization, BatchNormalization, other operations, or a combination thereof), until another convolutional layer, a Dense operation, or the output of the CNN is reached. Similarly, a Dense layer can be a group of operations or layers starting with a Dense operation (i.e., a fully connected layer) followed by zero or more operations (e.g., Pooling, Dropout, Activation, Normalization, BatchNormalization, other operations, or a combination thereof) until another convolution layer, another Dense layer, or the output of the network is reached. The boundary between feature extraction based on convolutional networks and a feature classification using Dense operations can be marked by a Flatten operation, which flattens the multidimensional matrix from the feature extraction into a vector.

In a typical CNN, each of the convolution layers may consist of a set of filters. While a filter is applied to a subset of the input data at a time, the filter is applied across the full input, such as by sweeping over the input. The operations performed by this layer are typically linear/matrix multiplications. An example of a convolution filter is described with respect to FIG. 14. The output of the convolution filter may be further filtered using an activation function. The activation function may be a linear function or non-linear function (e.g., a sigmoid function, an arcTan function, a tanH function, a ReLu function, or the like).

Each of the fully connected operations is a linear operation in which every input is connected to every output by a weight. As such, a fully connected layer with N number of inputs and M outputs can have a total of NxM weights. As mentioned above, a Dense operation may be generally followed by a non-linear activation function to generate an output of that layer.

Some CNN network architectures used to perform analysis of frames and superblocks (such as to infer a partition as described herein), may include several feature extraction portions that extract features at different granularities (e.g., at different sub-block sizes of a superblock) and a flattening layer (which may be referred to as a concatenation layer) that receives the output(s) of the last convolution layer of each of the extraction portions. The flattening layer aggregates all the features extracted by the different feature extractions portions into one input set. The output of the flattening layer may be fed into (i.e., used as input to) the fully connected layers of the classification portion. As such, the number of parameters of the entire network may be dominated (e.g., defined, set) by the number of parameters at the interface between the feature extraction portion (i.e., the convolution layers) and the classification portion (i.e., the fully connected layers). That is, the number of parameters of the network is dominated by the parameters of the flattening layer.

CNN architectures that include a flattening layer whose output is fed into fully connected layers can have several disadvantages.

For example, the machine-learning model of such architectures tend to have a large number of parameters and operations. In some situations, the machine-learning model may include over 1 million parameters. Such large models may not be effectively or efficiently used, if at all, to infer classifications on devices (e.g., mobile devices) that may be constrained (e.g., computationally constrained, energy constrained, and/or memory constrained). That is, some devices may not have sufficient computational capabilities (for example, in terms of speed) or memory storage (e.g., RAM) to handle (e.g., execute) such large models.

As another example, and more importantly, the fully connected layers of such network architectures are said to have a global view of all the features that are extracted by the feature extraction portions. As such, the fully connected layers may, for example, lose a correlation between a feature and the location of the feature in the input image. As such, the receptive fields of the convolution operations can become mixed by the fully connected layers. A receptive field can be defined as the region in the input space that a particular feature is looking at and/or is affected by. An example of a receptive field is described with respect to FIG. 15.

To briefly illustrate the problem (i.e., that the receptive fields become mixed), reference is made to FIG. 7, which is described below in more detail. A CNN as described above (e.g., a CNN that includes a flattening layer and fully connected layers) may be used to determine a partition of a block 702 of FIG. 7. The CNN may extract features corresponding to different regions and/or sub-block sizes of the block 702. As such, for example, features extracted from blocks 702-1, 702-2, 702-3, and 702-4 of the block 702 are flattened into one input vector to the fully connected layers. As such, in inferring, by the fully connected layers, whether to partition the sub-block 702-2 into blocks 702-5, 702-6, 702-7, and 702-8, features of at least one of the blocks 702-1, 702-3, 702-4 may be used by the fully connected layers. As such, features of sub-blocks (e.g., the blocks 702-1, 702-3, 702-4), which are unrelated to the sub-block (e.g., the block 702-2) for which a partition decision is to be inferred, may be used in the inference. This is undesirable as it may lead to erroneous inferences and/or inferences that are based on irrelevant information. As such, it is important that the analysis of an image region be confined to the boundaries of the quadtree representation of image region.

As such, also described herein is receptive-field-conforming convolutional models for video coding. That is, when analyzing an image region, such as for determining a quadtree partitioning, the receptive fields of any features extracted (e.g., calculated, inferred, etc.) for the image region are confined to the image region itself. Implementations according to this disclosure can ensure that machine-learning models (generated during training and used during inference) for determining block partitioning are not erroneously based on irrelevant or extraneous features, such as pixels from outside the image region.

Implementations according to this disclosure result in CNN machine-learning models with reduced numbers of parameters and/or that respect the receptive field of an image block (e.g., a superblock) when analyzing the image block for extracting quadtree-based features of the image block. As such, the inference accuracy for mode decision in video encoding can be significantly improved.

Efficient use of quantization parameters in machine-learning models for video coding and receptive-field-conforming convolutional models for video coding are described herein first with reference to a system in which the teachings may be incorporated.

It is noted that details of machine learning, convolutional neural networks, and/or details that are known to a person skilled in the art are omitted herein. For example, a skilled person in the art recognizes that the values of convolutional filters and the weights of connections between nodes (i.e., neurons) in a CNN are determined by the CNN during the training phase. Accordingly, such are not discussed in detail herein.

FIG. 1 is a schematic of a video encoding and decoding system 100. A transmitting station 102 can be, for example, a computer having an internal configuration of hardware, such as that described with respect to FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
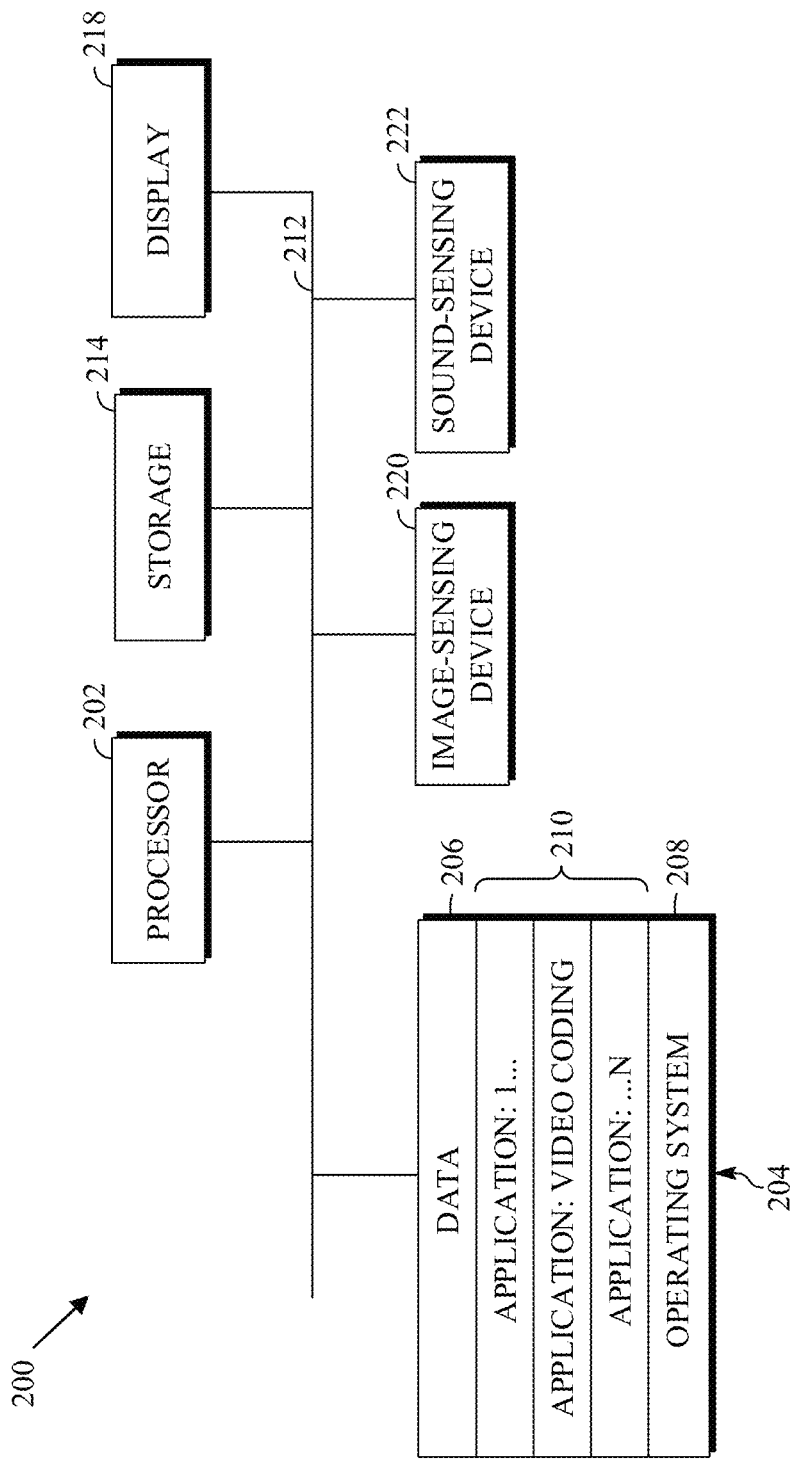
FIG. 2 is a block diagram of an example of a computing device that can implement a transmitting station or a receiving station.

In one example, the receiving station 106 can be a computer having an internal configuration of hardware, such as that described with respect to FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP (e.g., an HTTP-based video streaming protocol) may be used.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, now-existing or hereafter developed, capable of manipulating or processing information. Although the disclosed implementations can be practiced with a single processor as shown (e.g., the CPU 202), advantages in speed and efficiency can be achieved by using more than one processor.

In an implementation, a memory 204 in the computing device 200 can be a read-only memory (ROM) device or a random-access memory (RAM) device. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described herein. For example, the application programs 210 can include applications 1 through N, which further include a video coding application that performs the methods described herein. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD); a cathode-ray tube (CRT) display; or a light-emitting diode (LED) display, such as an organic LED (OLED) display.

The computing device 200 can also include or be in communication with an image-sensing device 220, for example, a camera, or any other image-sensing device, now existing or hereafter developed, that can sense an image, such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device, now existing or hereafter developed, that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines, such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit, such as a memory card, or multiple units, such as multiple memory cards. The computing device 200 can thus be implemented in a wide variety of configurations.

Figure 3:
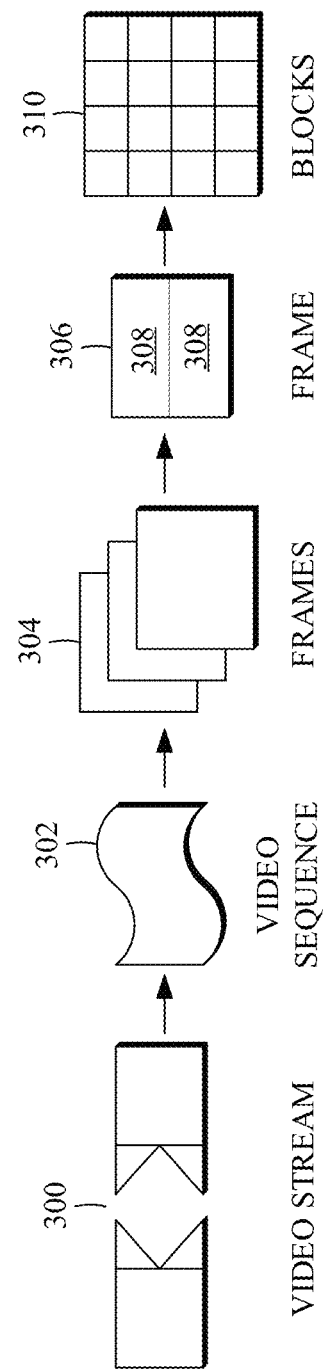
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size, such as 4×4 pixels, 8×8 pixels, 16×8 pixels, 8×16 pixels, 16×16 pixels, or larger.

Figure 4:
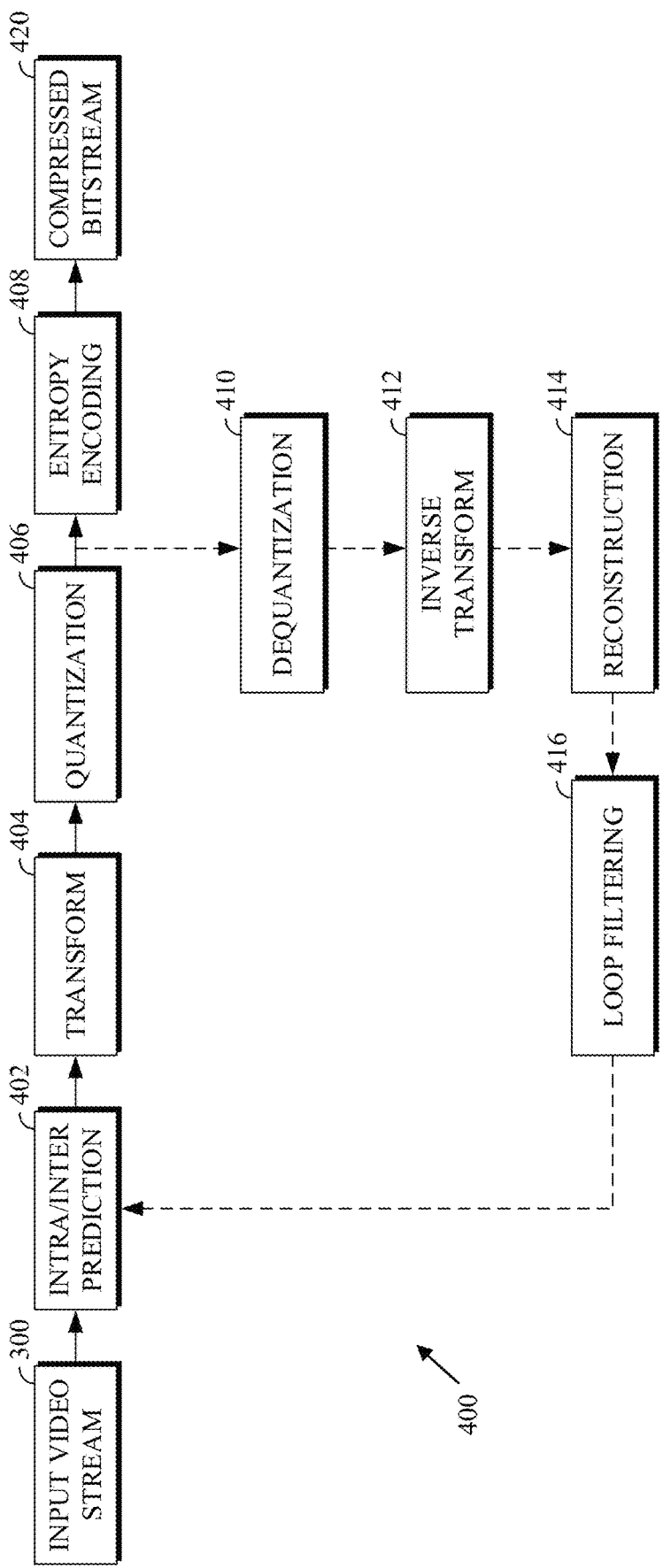
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102, such as by providing a computer software program stored in memory, for example, the memory 204. The computer software program can include machine instructions that, when executed by a processor, such as the CPU 202, cause the transmitting station 102 to encode video data in manners described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter-prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter-prediction stage 402, a block can be encoded using intra-frame prediction (also called intra-prediction) or inter-frame prediction (also called inter-prediction), or a combination of both. In any case, a prediction block can be formed. In the case of intra-prediction, all or part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter-prediction stage 402 to produce a residual block (also called a residual). The transform stage 404 transforms the residual into transform coefficients in, for example, the frequency domain using block-based transforms. Such block-based transforms (i.e., transform types) include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient is at the top-left of the matrix, and the highest frequency coefficient is at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block (which may include, for example, the type of prediction used, transform type, motion vectors, and quantizer value), are then output to the compressed bitstream 420. The information to decode the block may be entropy coded into block, frame, slice, and/or section headers within the compressed bitstream 420. The compressed bitstream 420 can also be referred to as an encoded video stream or encoded video bitstream; these terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process and that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter-prediction stage 402 can be added to the derivative residual to create a reconstructed block. The loop filtering stage 416 can be applied to the reconstructed block to reduce distortion, such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
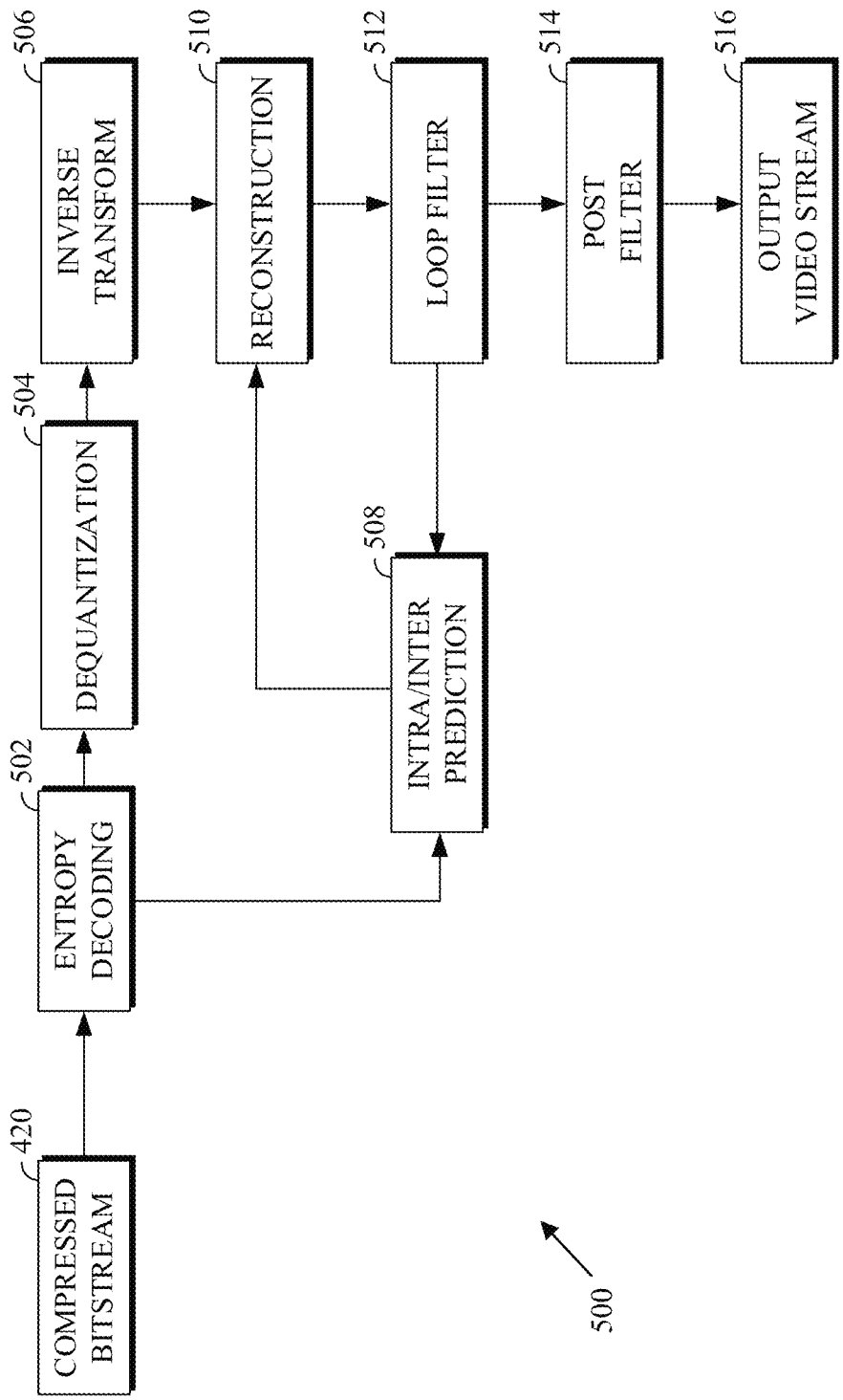
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor, such as the CPU 202, cause the receiving station 106 to decode video data in the manners described below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512, and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, for example, at the intra/inter-prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the post filtering stage 514 is applied to the reconstructed block to reduce blocking distortion, and the result is output as an output video stream 516. The output video stream 516 can also be referred to as a decoded video stream; these terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied after the loop filtering stage 512. The loop filtering stage 512 can include an optional deblocking filtering stage. Additionally, or alternatively, the encoder 400 includes an optional deblocking filtering stage in the loop filtering stage 416.

A codec can use multiple transform types. For example, a transform type can be the transform type used by the transform stage 404 of FIG. 4 to generate the transform block. For example, the transform type (i.e., an inverse transform type) can be the transform type to be used by the dequantization stage 504 of FIG. 5. Available transform types can include a one-dimensional Discrete Cosine Transform (1D DCT) or its approximation, a one-dimensional Discrete Sine Transform (1D DST) or its approximation, a two-dimensional DCT (2D DCT) or its approximation, a two-dimensional DST (2D DST) or its approximation, and an identity transform. Other transform types can be available. In an example, a one-dimensional transform (1D DCT or 1D DST) can be applied in one dimension (e.g., row or column), and the identity transform can be applied in the other dimension.

In the cases where a 1D transform (e.g., 1D DCT, 1D DST) is used (e.g., 1D DCT is applied to columns (or rows, respectively) of a transform block), the quantized coefficients can be coded by using a row-by-row (i.e., raster) scanning order or a column-by-column scanning order. In the cases where 2D transforms (e.g., 2D DCT) are used, a different scanning order may be used to code the quantized coefficients. As indicated above, different templates can be used to derive contexts for coding the non-zero flags of the non-zero map based on the types of transforms used. As such, in an implementation, the template can be selected based on the transform type used to generate the transform block. As indicated above, examples of a transform type include: 1D DCT applied to rows (or columns) and an identity transform applied to columns (or rows); 1D DST applied to rows (or columns) and an identity transform applied to columns (or rows); 1D DCT applied to rows (or columns) and 1D DST applied to columns (or rows); a 2D DCT; and a 2D DST. Other combinations of transforms can comprise a transform type.

Figure 6:
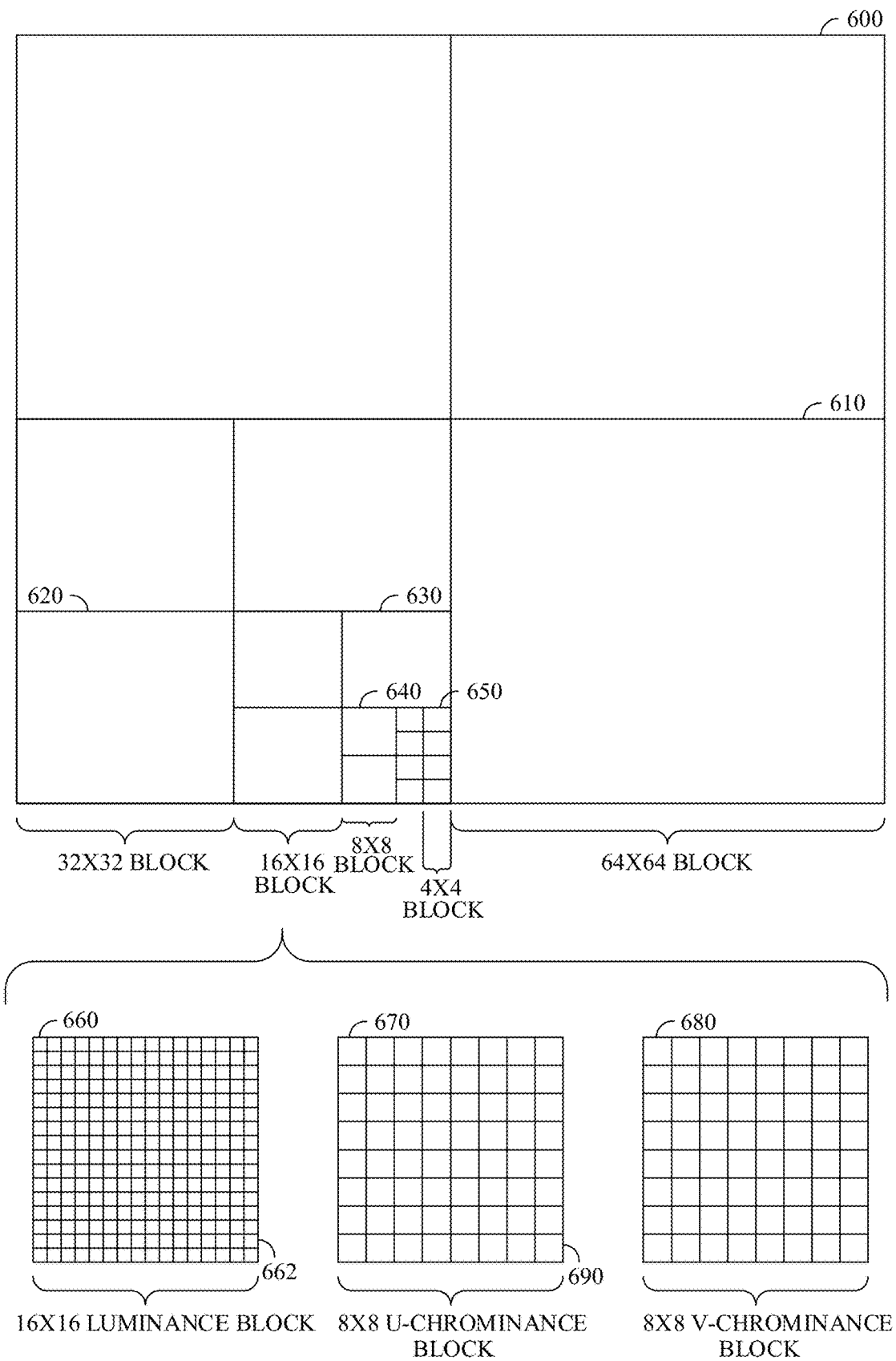
FIG. 6 is a block diagram of a representation of a portion of a frame according to implementations of this disclosure.

FIG. 6 is a block diagram of a representation of a portion 600 of a frame, such as the frame 306 of FIG. 3, according to implementations of this disclosure. As shown, the portion 600 of the frame includes four 64×64 blocks 610, which may be referred to as superblocks, in two rows and two columns in a matrix or Cartesian plane. A superblock can have a larger or a smaller size. While FIG. 6 is explained with respect to a superblock of size 64×64, the description is easily extendable to larger (e.g., 128×128) or smaller superblock sizes.

In an example, and without loss of generality, a superblock can be a basic or maximum coding unit (CU). Each superblock can include four 32×32 blocks 620. Each 32×32 block 620 can include four 16×16 blocks 630. Each 16×16 block 630 can include four 8×8 blocks 640. Each 8×8 block 640 can include four 4×4 blocks 650. Each 4×4 block 650 can include 16 pixels, which can be represented in four rows and four columns in each respective block in the Cartesian plane or matrix. The pixels can include information representing an image captured in the frame, such as luminance information, color information, and location information. In an example, a block, such as a 16×16-pixel block as shown, can include a luminance block 660, which can include luminance pixels 662; and two chrominance blocks 670/680, such as a U or Cb chrominance block 670, and a V or Cr chrominance block 680. The chrominance blocks 670/680 can include chrominance pixels 690. For example, the luminance block 660 can include 16×16 luminance pixels 662, and each chrominance block 670/680 can include 8×8 chrominance pixels 690, as shown. Although one arrangement of blocks is shown, any arrangement can be used. Although FIG. 6 shows N×N blocks, in some implementations, N×M, where M≠M, blocks can be used. For example, 32×64 blocks, 64×32 blocks, 16×32 blocks, 32×16 blocks, or any other size blocks can be used. In some implementations, N×2N blocks, 2N×N blocks, or a combination thereof can be used.

In some implementations, video coding can include ordered block-level coding. Ordered block-level coding can include coding blocks of a frame in an order, such as raster-scan order, wherein blocks can be identified and processed starting with a block in the upper left corner of the frame, or a portion of the frame, and proceeding along rows from left to right and from the top row to the bottom row, identifying each block in turn for processing. For example, the superblock in the top row and left column of a frame can be the first block coded, and the superblock immediately to the right of the first block can be the second block coded. The second row from the top can be the second row coded, such that the superblock in the left column of the second row can be coded after the superblock in the rightmost column of the first row.

In an example, coding a block can include using quad-tree coding, which can include coding smaller block units with a block in raster-scan order. The 64×64 superblock shown in the bottom-left corner of the portion of the frame shown in FIG. 6, for example, can be coded using quad-tree coding in which the top-left 32×32 block can be coded, then the top-right 32×32 block can be coded, then the bottom-left 32×32 block can be coded, and then the bottom-right 32×32 block can be coded. Each 32×32 block can be coded using quad-tree coding in which the top-left 16×16 block can be coded, then the top-right 16×16 block can be coded, then the bottom-left 16×16 block can be coded, and then the bottom-right 16×16 block can be coded. Each 16×16 block can be coded using quad-tree coding in which the top-left 8×8 block can be coded, then the top-right 8×8 block can be coded, then the bottom-left 8×8 block can be coded, and then the bottom-right 8×8 block can be coded. Each 8×8 block can be coded using quad-tree coding in which the top-left 4×4 block can be coded, then the top-right 4×4 block can be coded, then the bottom-left 4×4 block can be coded, and then the bottom-right 4×4 block can be coded. In some implementations, 8×8 blocks can be omitted for a 16×16 block, and the 16×16 block can be coded using quad-tree coding in which the top-left 4×4 block can be coded, and then the other 4×4 blocks in the 16×16 block can be coded in raster-scan order.

In an example, video coding can include compressing the information included in an original, or input, frame by omitting some of the information in the original frame from a corresponding encoded frame. For example, coding can include reducing spectral redundancy, reducing spatial redundancy, reducing temporal redundancy, or a combination thereof.

In an example, reducing spectral redundancy can include using a color model based on a luminance component (Y) and two chrominance components (U and V or Cb and Cr), which can be referred to as the YUV or YCbCr color model or color space. Using the YUV color model can include using a relatively large amount of information to represent the luminance component of a portion of a frame and using a relatively small amount of information to represent each corresponding chrominance component for the portion of the frame. For example, a portion of a frame can be represented by a high-resolution luminance component, which can include a 16×16 block of pixels, and by two lower resolution chrominance components, each of which representing the portion of the frame as an 8×8 block of pixels. A pixel can indicate a value (e.g., a value in the range from 0 to 255) and can be stored or transmitted using, for example, eight bits. Although this disclosure is described with reference to the YUV color model, any color model can be used.

Reducing spatial redundancy can include transforming a block into the frequency domain as described above. For example, a unit of an encoder, such as the entropy encoding stage 408 of FIG. 4, can perform a DCT using transform coefficient values based on spatial frequency.

Reducing temporal redundancy can include using similarities between frames to encode a frame using a relatively small amount of data based on one or more reference frames, which can be previously encoded, decoded, and reconstructed frames of the video stream. For example, a block or a pixel of a current frame can be similar to a spatially corresponding block or pixel of a reference frame. A block or a pixel of a current frame can be similar to a block or a pixel of a reference frame at a different spatial location. As such, reducing temporal redundancy can include generating motion information indicating the spatial difference (e.g., a translation between the location of the block or the pixel in the current frame and the corresponding location of the block or the pixel in the reference frame).

Reducing temporal redundancy can include identifying a block or a pixel in a reference frame, or a portion of the reference frame, that corresponds with a current block or pixel of a current frame. For example, a reference frame, or a portion of a reference frame, which can be stored in memory, can be searched for the best block or pixel to use for encoding a current block or pixel of the current frame. For example, the search may identify the block of the reference frame for which the difference in pixel values between the reference block and the current block is minimized, and can be referred to as motion searching. The portion of the reference frame searched can be limited. For example, the portion of the reference frame searched, which can be referred to as the search area, can include a limited number of rows of the reference frame. In an example, identifying the reference block can include calculating a cost function, such as a sum of absolute differences (SAD), between the pixels of the blocks in the search area and the pixels of the current block.

The spatial difference between the location of the reference block in the reference frame and the current block in the current frame can be represented as a motion vector. The difference in pixel values between the reference block and the current block can be referred to as differential data, residual data, or as a residual block. In some implementations, generating motion vectors can be referred to as motion estimation, and a pixel of a current block can be indicated based on location using Cartesian coordinates such as $f_{x,y}$. Similarly, a pixel of the search area of the reference frame can be indicated based on a location using Cartesian coordinates such as $r_{x,y}$. A motion vector (MV) for the current block can be determined based on, for example, a SAD between the pixels of the current frame and the corresponding pixels of the reference frame.

As mentioned above, a superblock can be coded using quad-tree coding. FIG. 7 is a block diagram of an example 700 of a quad-tree representation of a block according to implementations of this disclosure. The example 700 includes the block 702. As mentioned above, the block 702 can be referred to as a superblock or a CTB. The example 700 illustrates a partition of the block 702. However, the block 702 can be partitioned differently, such as by an encoder (e.g., the encoder 400 of FIG. 4) or a machine-learning model (such as described with respect to FIGS. 10-11). Partitioning a block by an encoder, such as the encoder 400 of FIG. 4, is referred to herein as brute-force approach to encoding.

The example 700 illustrates that the block 702 is partitioned into four blocks, namely, the blocks 702-1, 702-2, 702-3, and 702-4. The block 702-2 is further partitioned into the blocks 702-5, 702-6, 702-7, and 702-8. As such, if, for example, the size of the block 702 is N×N (e.g., 128×128), then the blocks 702-1, 702-2, 702-3, and 702-4 are each of size N/2×N/2 (e.g., 64×64), and the blocks 702-5, 702-6, 702-7, and 702-8 are each of size N/4×N/4 (e.g., 32×32). If a block is partitioned, it is partitioned into four equally sized, non-overlapping square sub-blocks.

A quad-tree data representation is used to describe how the block 702 is partitioned into sub-blocks, such as blocks 702-1, 702-2, 702-3, 702-4, 702-5, 702-6, 702-7, and 702-8. A quad-tree 703 of the partition of the block 702 is shown. Each node of the quad-tree 703 is assigned a flag of "1" if the node is further split into four sub-nodes and assigned a flag of "0" if the node is not split. The flag can be referred to as a split bit (e.g., 1) or a stop bit (e.g., 0) and is coded in a compressed bitstream. In a quad-tree, a node either has four child nodes or has no child nodes. A node that has no child nodes corresponds to a block that is not split further. Each of the child nodes of a split block corresponds to a sub-block.

In the quad-tree 703, each node corresponds to a sub-block of the block 702. The corresponding sub-block is shown between parentheses. For example, a node 704-1, which has a value of 0, corresponds to the block 702-1.

A root node 704-0 corresponds to the block 702. As the block 702 is split into four sub-blocks, the value of the root node 704-0 is the split bit (e.g., 1). At an intermediate level, the flags indicate whether a sub-block of the block 702 is further split into four sub-sub-blocks. In this case, a node 704-2 includes a flag of "1" because the block 702-2 is split into the blocks 702-5, 702-6, 702-7, and 702-8. Each of nodes 704-1, 704-3, and 704-4 includes a flag of "0" because the corresponding blocks are not split. As nodes 704-5, 704-6, 704-7, and 704-8 are at a bottom level of the quad-tree, no flag of "0" or "1" is necessary for these nodes. That the blocks 702-5, 702-6, 702-7, and 702-8 are not split further can be inferred from the absence of additional flags corresponding to these blocks.

The quad-tree data representation for the quad-tree 703 can be represented by the binary data of "10100," where each bit represents a node 704 of the quad-tree 703. The binary data indicates the partitioning of the block 702 to the encoder and decoder. The encoder can encode the binary data in a compressed bitstream, such as the compressed bitstream 420 of FIG. 4, in a case where the encoder needs to communicate the binary data to a decoder, such as the decoder 500 of FIG. 5.

The blocks corresponding to the leaf nodes of the quad-tree 703 can be used as the bases for prediction. That is, prediction can be performed for each of the blocks 702-1, 702-5, 702-6, 702-7, 702-8, 702-3, and 702-4, referred to herein as coding blocks. As mentioned with respect to FIG. 6, the coding block can be a luminance block or a chrominance block. It is noted that, in an example, the superblock partitioning can be determined with respect to luminance blocks. The same partition can be used with the chrominance blocks.

A prediction type (e.g., intra- or inter-prediction) is determined at the coding block (e.g., a block 702-1, 702-5, 702-6, 702-7, 702-8, 702-3, or 702-4) level. That is, a coding block is the decision point for prediction.

As mentioned above, a mode decision process (e.g., partition decision process) determines the quad-tree partition of a coding block, such as the block 702. The partition decision process calculates the RD costs of different combinations of coding parameters. That is, for example, different combinations of prediction blocks and predictions (e.g., intra-prediction, inter-prediction, etc.) are examined to determine an optimal partitioning.

As a person skilled in the art recognizes, many mode decision processes can be performed by an encoder.

Figure 8:
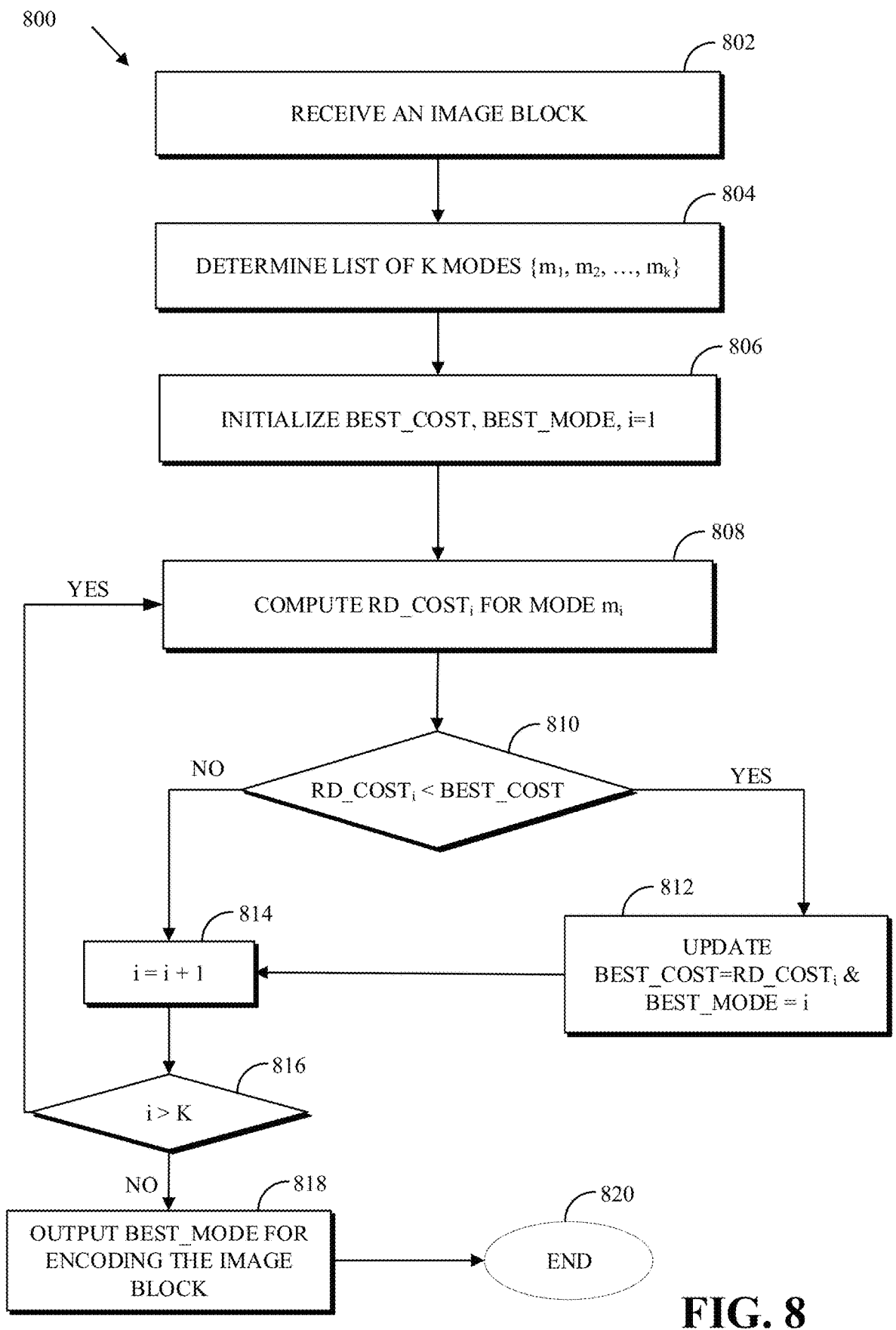
FIG. 8 is a flowchart of a process for searching for a best mode to code a block.

FIG. 8 is a flowchart of a process 800 process for searching for a best mode to code a block. The process 800 is an illustrative, high level process of a mode decision process that determines a best mode. For ease of description, the process 800 is described with respect to selecting an intra-prediction mode for encoding a prediction block. Other examples of best modes that can be determined by processes similar to the process 800 include determining a transform type and determining a transform size. The process 800 can be implemented by an encoder, such as the encoder 400 of FIG. 4, using a brute-force approach to mode decision.

At 802, the process 800 receives an image block. As the process 800 is described with respect to determining an intra-prediction mode, the image block can be a prediction unit. As described with respect to FIG. 7, each of the leaf node coding blocks (e.g., a block 702-1, 702-5, 702-6, 702-7, 702-8, 702-3, or 702-4) can be partitioned into one or more prediction units. As such, the image block can be one such prediction unit.

At 804, the process 800 determines (e.g., selects, calculates, choses, etc.) a list of modes. The list of modes can include K modes, where K is an integer number. The list of modes can be denoted $\{m_1, m_2, \ldots, m_k\}$. The encoder can have available a list of intra-prediction modes. For example, the list of available intra-prediction modes can be {DC_PRED, V_PRED, H_PRED, D45_PRED, D135_PRED, D117_PRED, D153_PRED, D207_PRED, D63_PRED, SMOOTH_PRED, SMOOTH_V_PRED, and SMOOTH_H_PRED, PAETH_PRED}. A description of these intra-prediction modes is omitted as the description in impertinent to the understanding of this disclosure. The list of modes determined at 804 can be any subset of the list of available intra-prediction modes.

At 806, the process 800 initializes a BEST_COST variable to a high value (e.g., INT_MAX, which may be equal to 2,147,483,647) and initializes a loop variable i to 1, which corresponds to the first mode to be examined.

At 808, the process 800 computes (e.g., calculates) an $RD\_COST_i$ for the $mode_i$. At 810, the process 800 tests whether the RD cost, $RD\_COST_i$, of the current mode under examination, $mode_i$, is less than the current best cost, BEST_COST. If the test is positive, then at 812, the process 800 updates the best cost to be the cost of the current mode (i.e., BEST_COST=$RD\_COST_i$) and sets the current best mode index (BEST_MODE) to the loop variable i (BEST_MODE=i). The process 800 then proceeds to 814 to increment the loop variable i (i.e., i=i+1) to prepare for examining the next mode (if any). If the test is negative, then the process 800 proceeds to 814.

At 816, if there are more modes to examine, the process 800 proceeds back to 808; otherwise the process 800 proceeds to 816. At 816, the process 800 outputs the index of the best mode, BEST_MODE. Outputting the best mode can mean returning the best mode to a caller of the process 800. Outputting the best mode can mean encoding the image using the best mode. Outputting the best mode can have other semantics. The process 800 terminates at 820.

Figure 9:
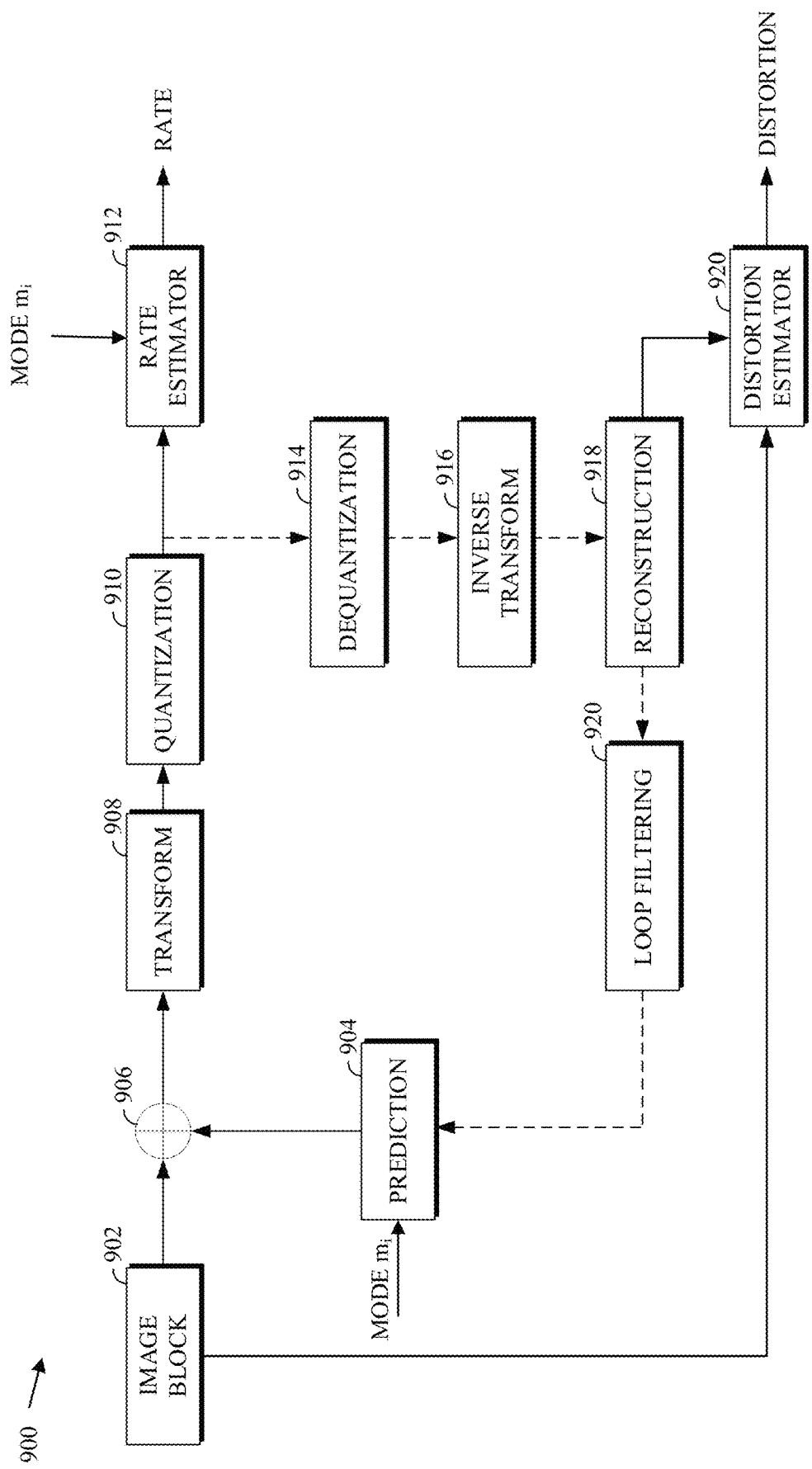
FIG. 9 is a block diagram of an example of estimating the rate and distortion costs of coding an image block by using a prediction mode.

FIG. 9 is a block diagram of an example 900 of estimating the rate and distortion costs of coding an image block X by using a prediction mode $m_i$. The process 900 can be performed by an encoder, such as the encoder 400 of FIG. 4. The process 900 includes performing a hypothetical encoding of the image block X using the prediction mode $m_i$ to determine the RD cost of encoding the block. The process 900 can be used by the process 800 at 808.

A hypothetical encoding process is a process that carries out the coding steps but does not output bits into a compressed bitstream, such as the compressed bitstream 420 of FIG. 4. Since the purpose is to estimate a rate (also referred as bit rate), a hypothetical encoding process may be regarded or called a rate estimation process. The hypothetical encoding process computes the number of bits (RATE) required to encode the image block X. The example 900 also calculates a distortion (DISTORTION) based on a difference between the image block X and a reconstructed version of the image block X.

At 904, a prediction, using the mode $m_i$ is determined. The prediction can be determined as described with respect to intra/inter-prediction stage 402 of FIG. 4. At 906, a residual is determined as a difference between the image block 902 and the prediction. At 908 and 910, the residual is transformed and quantized, such as described, respectively, with respect to the transform stage 404 and the quantization stage 406 of FIG. 4. The rate (RATE) is calculated by a rate estimator 912, which performs the hypothetical encoding. In an example, the rate estimator 912 can perform entropy encoding, such as described with respect to the entropy encoding stage 408 of FIG. 4.

The quantized residual is dequantized at 914 (such as described, for example, with respect to the dequantization stage 410 of FIG. 4), inverse transformed at 916 (such as described, for example, with respect to the inverse transform stage 412 of FIG. 4), and reconstructed at 918 (such as described, for example, with respect to the reconstruction stage 414 of FIG. 4) to generate a reconstructed block. A distortion estimator 920 calculates the distortion (i.e., the loss in video quality) between the image block X and the reconstructed block. In an example, the distortion can be a mean square error between pixel values of the image block X and the reconstructed block. The distortion can be a sum of absolute differences error between pixel values of the image block X and the reconstructed block. Any other suitable distortion measure can be used.

The rate, RATE, and distortion, DISTORTION, are then combined into a scalar value (i.e., the RD cost) by using the Lagrange multiplier as shown in formula (5)

$$\text{DISTORTION} + \lambda_{mode} \times \text{RATE}, \quad (5)$$

The Lagrange multiplier $\lambda_{mode}$ of the formula 5 can be calculated as described above, depending on the encoder performing the operations of the example 900.

FIGS. 8 and 9 illustrate that the traditional (i.e., bruteforce) approach to mode decision is largely a serial process that essentially codes an image block X by using candidate modes to determine the mode with the best cost. Techniques have been used to reduce the complexity in mode decision. For example, early termination techniques have been used to terminate the loop of the process 800 of FIG. 8 as soon as certain conditions are met, such as, for example, that the rate distortion cost is lower than a threshold. Other techniques include selecting, for example based on heuristics, a subset of the available candidate modes or using multi-passes over the candidate modes. However, such techniques may not sufficiently reduce the complexity in mode decision.

Figure 10:
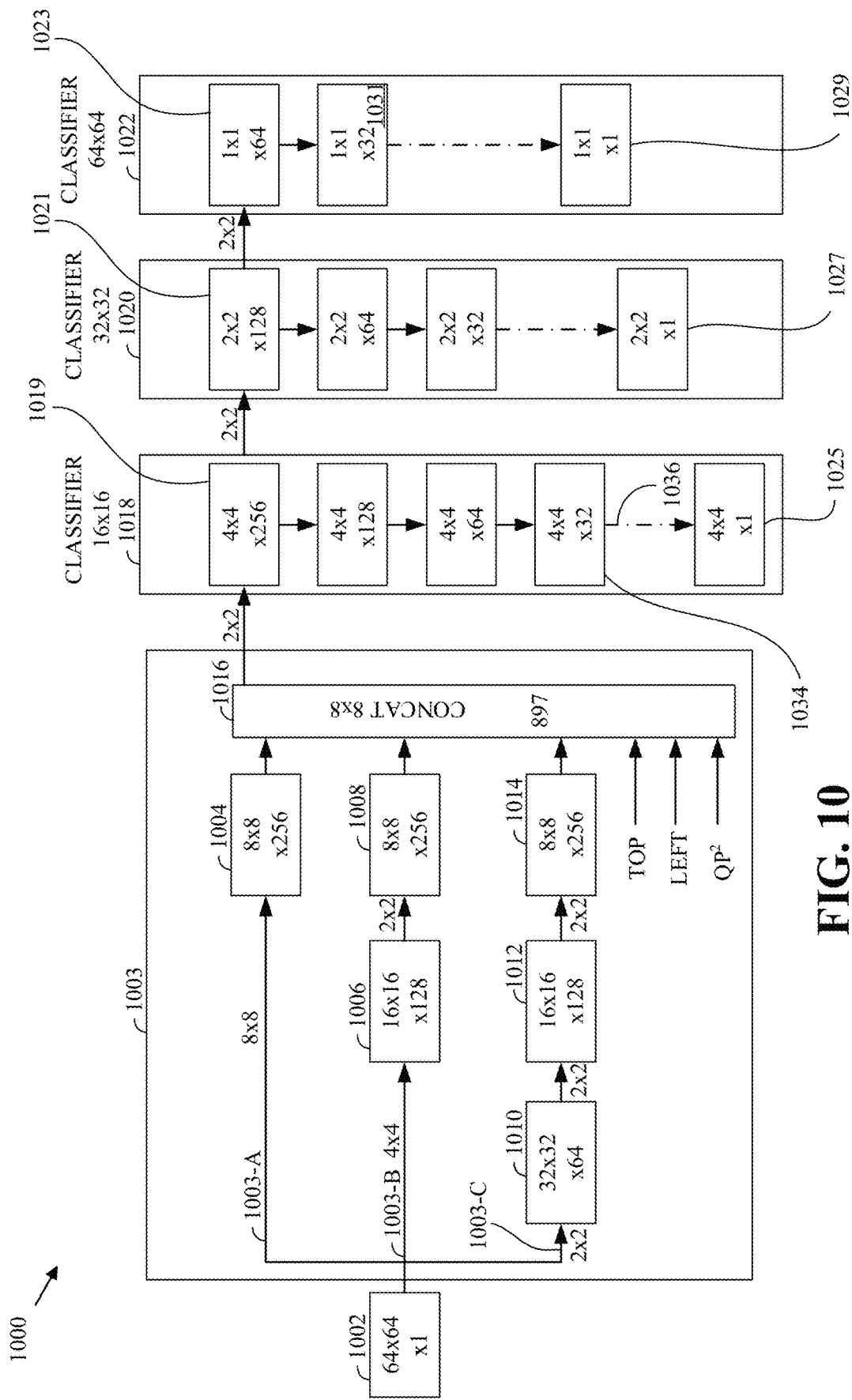
FIG. 10 is a block diagram of an example of a convolutional neural network (CNN) for mode decision using a non-linear function of a quantization parameter according to implementations of this disclosure.

Machine learning can be used to reduce the computational complexity in mode decision. As mentioned above, an encoder may perform several mode decision processes. If a mode decision requires the use of the QP (for example to determine RD costs), then it is critical that the correct form (i.e., function) of the QP is used during the learning and the inferencing phases of the machine learning. FIG. 10 is an illustrative example of using a non-linear function of the QP with a machine-learning model.

FIG. 10 is a block diagram of an example of a convolutional neural network (CNN) 1000 for mode decision using a non-linear function of a quantization parameter (QP) according to implementations of this disclosure. More specifically, the CNN 1000 can be used for determining a block partition of an image block. The block can be a superblock. For example, the CNN can be used to determine the block size used in the intra/inter-prediction stage 402 of FIG. 4. The partition can be a quad-tree partition, such as described with respect to FIG. 7. The CNN 1000 can be used to determine a partition for an intra-coded block. As such, the block can be a block of intra-coded frame, such as the frame 304 of FIG. 3. The CNN 1000 can be used by an encoder where the smallest possible block partition is an 8×8 partition. As such, determinations of whether to split a block need be made for blocks (i.e., sub-blocks of the superblock) that are 16×16 or larger.

The architecture of the CNN 1000 is described with respect to FIG. 10. The training and using (i.e., for inferencing) of the CNN 1000 are described with respect to FIG. 11.

As further described below, the number of parallel branches of the feature extraction portion of the CNN 1000 can be parameterizable (e.g., configurable). For example, in a configuration, only 1 branch (e.g., a linear branch) can be used. This is possible as long as the receptive field conformance property, as further described below, is maintained. Except for the top and left rows of the block, the receptive field conformance property means that the receptive field boundary of the block does not cross the boundaries of the block.

A block 1002 (i.e., an image block) to be encoded is presented to the CNN 1000. The block 1002 can be a one color-plane block. As such, the block 1002 can be a luminance block. That the block is a one color-plane block is illustrated by the "×1" in "64×64×1" in FIG. 10. As mentioned, the block 1002 can be a superblock. While a superblock of size 64×64 is shown and used to describe the CNN 1000, the block 1002 can be of any size. For example, the block 1002 can be 128×128, 32×32, or any size block for which a quad tree partition is typically determined by the encoder. As mentioned above, the encoder can be an H.264, a VP9, an HEVC, an H.263, an AV1, or any other encoder that uses QP in mode decision determination. In another example, and since prediction modes can depend on adjacent (i.e., peripheral) pixels to a block that is to be partitioned, the block 1002 (i.e., the block that is used as input to the CNN 1000) can include pixels that are outside of the block for which a partitioning is to be determined. For example, if a partitioning of a 64×64 is to be determined, then a block of size 65×65×1 can be used as input to the CNN 1000. That is, for example, the left and top neighboring pixels of the block for which a partitioning is to determined can be included in the input block to the CNN 1000. In such a case, and in order to preserve the receptive field property as described below, a first filter (e.g., a first filter in each branch of the feature extraction layers) can be of size $2^k+1$ and the stride will can be $2^k$.

A feature extraction layers 1003, as shown, includes three branches; namely a branch 1003-A, a branch 1003-B, and a branch 1003-C. The number of branches in the feature extraction layer can be configurable to include more or fewer branches. Each of the branches can include one or more layers. At each layer, respective feature maps are extracted. In the description below, features maps, such as a feature maps 1004, having a dimension of A×B×C are referred to. For example, the feature maps 1004 is of size 8×8×256. This is to be interpreted as follows: the feature maps 1004 includes 256 feature maps and each of the feature maps is of size 8×8 pixels (or features). As such, the feature maps 1004 can be thought of as a set of 256 matrices where each matrix is of size 8×8. In one configuration of the CNN 1000, the feature extraction of each partition type can be separated, instead of sharing the feature extraction as in FIG. 10.

The number of features at a feature map can be configurable. For example, while the feature maps 1004 in shown to be 8×8×256, it can be 8×8×N, where N is any desired number of features. In some examples, a feature compression rate can be applied to a machine-learning model to expand or reduce the number of features in the model. For example, the feature compression rate can be multiplied by all feature maps for feature expansion (or reduction).

The branch 1003-A extracts, in a first layer of the branch 1003-A, features corresponding to 8×8 blocks of the block 1002. The branch 1003-A convolves, with the block 1002, 256 filters (also referred to as kernels). Each of the filters is of size 8×8. A stride that is equal to the size of the filters (i.e., a stride that is equal to 8) is used. As such, 256 feature maps (i.e., the feature maps 1004), each of size 8×8, are extracted. A filter of size 8×8 is defined by a kernel of the same size where each entry in the kernel can be a real number. In an example, the entries can be non-negative integers that are greater than 1. Filtering an 8×8 block may thus be achieved by computing the inner product between the block and a filter kernel of the same size. In machine learning, filter kernels (i.e., the real numbers which constitute the values of the kernels) can be learned in the training process.

The branch 1003-B extracts 256 feature maps (i.e., feature maps 1008), each of size 8×8. The branch 1003-B first extracts, at a first layer of the branch 1003-B, feature maps 1006 by convolving the block 1002 with 128 filters, each of size 4×4, and using a stride of 4 (i.e., a stride that is equal to the filter size). At a second layer of the branch 1003-B, each of the 128 of the feature maps 1006 is convolved with two 2×2 filters, using a stride of 2, thereby resulting in the feature maps 1008.

The branch 1003-C extracts 256 feature maps (i.e., feature maps 1014), each of size 8×8. The branch 1003-C first extracts, at a first layer of the branch 1003-C, feature maps 1010 by convolving the block 1002 with 64 filters, each of size 2×2, and using a stride of 2. At a second layer of the branch 1003-B, each of the 64 of the feature maps 1010 is convolved with two 2×2 filters, using a stride of 2, thereby resulting in 128 feature maps (i.e., feature maps 1012). At a third layer of the branch 1003-C, each of the 128 of the feature maps 1012 is convolved with two 2×2 filters, using a stride of 2, thereby resulting in the feature maps 1014.

It is to be noted that, each time a filter is applied to a unit (e.g., the block 1002 or a feature map), the unit is downsized (i.e., down-sampled), in each dimension, by the size of the filter.

The feature maps 1010 are feature maps of the 32×32 blocks of the block 1002. The feature maps 1006 are feature maps of the 16×16 blocks of the block 1002. The feature maps 1004 are feature maps of the 8×8 blocks of the block 1002. The feature maps 1008 normalizes the feature maps 1006 to be, like the feature maps 1004, of size 8×8. Likewise, the feature maps 1012 followed by the feature maps 1014 normalize the feature maps 1010 to be, similarly, of size 8×8.

In an example, the feature maps can be normalized, via successive convolutions, to be feature maps of the smallest possible partition that can be used by the encoder. As such, the size 8×8 corresponding to the smallest possible partition type that can be used by the encoder when the CNN 1000 of FIG. 10 is used. Similarly, if the smallest possible partition were 4×4, then the feature extraction layers 1003 can normalize the feature maps to be of size 4×4. In an example, the feature extraction layers 1003 can include an additional branch and each of the branches would generate, via successive convolutions, feature maps that are each of size 4×4. In another example, the feature maps can be normalized to a size that does not necessarily correspond to the smallest partition size. For example, the features maps can be normalized to any size that is larger than or equal 8×8.

A concatenation layer 1016 receives the feature maps 1004, 1008, and 1014. Additionally, since the CNN 1000 is used to determine (e.g., infer, provide, etc.) a partition for the block 1002 that is to be intra-predicted, and as intra-prediction uses at least some samples (i.e., pixels) of neighboring blocks, at least some samples of the neighboring blocks can also be used as input to the concatenation layer 1016. While samples from the top neighboring block (indicated with TOP in FIG. 10) and samples from the left neighboring block (indicated with LEFT in FIG. 10) are shown for illustrative purposes, other neighboring blocks may be used, depending on the scan order used to process blocks of a video frame. For example, LEFT and TOP are used in the case of a raster scan order. In an implementation, all the samples of the top and left neighboring blocks are used as inputs to the concatenation layer 1016. However, and as mentioned above, samples of the top and left neighboring blocks can be included in the input block (e.g., the block 1002 of FIG. 10). Additionally, in a CNN that is used to determine other mode decision parameters (e.g., inter-prediction parameter), samples from neighboring blocks may or may not be used as inputs to the CNN.

In an implementation, and as a person skilled in the art appreciates, TOP can be a row of previously reconstructed pixels that are peripheral to the top edge of the block 1002; and LEFT can be a column of previously reconstructed pixels that are peripheral to the left edge of the block 1002. There can be up to 64 samples corresponding to TOP and up to 64 samples corresponding to LEFT. As mentioned above, TOP and LEFT can be added, instead or in addition, to the input block that is presented to the CNN.

A non-linear function of QP is also used as an input to the concatenation layer 1016. A quadratic function (i.e., $QP^2$) is illustrated in FIG. 10. However, as described above, the function used depends on the codec; more specifically, the function used depends on the standard implemented by the codec. For example, a quadratic function is used in the case of a codec that implements H.263, VP9, or AV1; and an exponential function is used in the case of a codec that implements H.264 or HEVC.

As such, and in the case that TOP and LEFT are fed directly to the concatenation layer 1016, a total of 897 inputs can be received by the concatenation layer 1016. The 897 inputs corresponding to: 256 (i.e., the feature maps 1004)+256 (i.e., the feature maps 1008)+256 (i.e., the features maps 1014)+64 (i.e., TOP)+64 (i.e., LEFT)+1 (i.e., the non-linear value of QP, such as $QP^2$)=897. In some implementations, a sample (i.e., a pixel) that is adjacent to the top-left corner of the block 1002 can also be used as an input to the concatenation layer 1016. In such a case, the concatenation layer 1016 receives 898 inputs.

The CNN 1000 includes three classifiers; namely, classifiers 1018, 1020, and 1022. Each of the classifiers 1018, 1020, 1022 includes a set of classification layers and uses convolutions as further described below.

The classifier 1018 infers (i.e., outputs) partition decisions for sub-blocks of size 16×16 of the block 1002. It is noted that the block 1002 can be partitioned into 4×4 blocks, each of size 16×16. As such, the classifier 1018 reduces, to a size of 4×4, the feature maps (which are each of size 8×8) received from the concatenation layer 1016.

First, feature maps 1019 are obtained from the feature maps received from the concatenation layer 1016 by applying non-overlapping convolutions using 2×2 separable convolution filters to combine some of the feature maps into one, thereby resulting in 256 feature maps, each of size 4×4.

Secondly, a series of 1×1 convolutions are applied, successively, to gradually reduce the feature dimension size to 1. As such, 1×1×128 convolutions (where the 128 being the number of filters) are applied, to the feature maps 1019, resulting in 4×4×128 feature maps, to which 1×1×64 convolutions (where the 64 being the number of filters) are applied resulting in 4×4×64 feature maps, to which 1×1×32 convolutions are applied resulting in 4×4×32 feature maps, to which a 1×1×1 convolution is applied resulting in a 4×4×1 feature map, namely the feature map 1025.

For each 16×16 sub-block of the block 1002, the classifier 1018 infers whether to split or not split the sub-block. As such, the classifier 1018 outputs 16 decisions corresponding, respectively, to each of the 16×16 sub-blocks of the block 1002. The 16 decisions can be binary decisions. That is, the feature map 1025 can be thought of as a matrix of binary decisions. For example, a zero (0) can correspond to a decision not to split a sub-block and a one (1) can correspond to a decision to split the sub-block. The order of the output of the classifier 1018 can correspond to a raster scan order of the 16×16 sub-blocks of the block 1002. In another example, the decisions can correspond to probabilities (i.e., values that range from 0 to 1), or some other values, such as values that range from 0 to 100. When a decision is greater than a threshold that is appropriate for the range of the decision values (e.g., 0.9, 0.75%, 90, etc.), it can be considered to correspond to a binary decision of 1.

The classifier 1020 infers (i.e., outputs) partition decisions for sub-blocks of size 32×32 of the block 1002. The classifier 1020 receives the feature maps 1019 and convolves each of the feature maps with a 2×2 separable convolution filters to combine feature maps of the feature maps 1019 into one, thereby resulting in feature maps 1021. It is noted that the block 1002 can be partitioned into 2×2 blocks, each of size 32×32. As such, the classifier 1020 reduces, to the size of 2×2, the feature maps 1019 (which are each of size 4×4) through a series of non-overlapping convolutions using 1×1 filters to gradually reduce the feature dimension size to 1, as described above with respect to the feature maps 1019, thereby resulting in a feature map 1027. For each 32×32 sub-block of the block 1002, the classifier 1020 infers whether to split or not split the sub-block. As such, the classifier 1020 outputs 4 decisions corresponding, respectively, to each of the 32×32 sub-blocks of the block 1002.

The classifier 1022 infers (i.e., outputs) partition decisions for the block 1002 itself. The classifier 1022 receives the feature maps 1021 and convolves each of the feature maps with a 2×2 separable convolution filter resulting in feature maps 1023, which some of the feature maps of the features maps 1021 into 1. It is noted that the block 1002 can be partitioned into only one 1×1 block of size 64×64. As such, the classifier 1022 reduces, to the size of 1×1, the feature maps 1023 (which are each of size 1×1) through a series of non-overlapping convolutions using 1×1 filters to gradually reduce the feature dimension size to 1, as described above with respect to the feature maps 1019, thereby resulting in a feature map 1029. For the block 1002, the classifier 1022 infers whether to split or not split the block 1002. As such, the classifier 1022 outputs 1 decision corresponding to whether to split or not split the block 1002 into four 32×32 sub-blocks.

Separable convolution filters of size 2×2 are described to obtain the feature maps 1019, 1021 and 1023 (of the classifiers 1018, 1020, and 1022, respectively) in order to ultimately determine, for a block of size 64×64, 4×4 16×16 partitions (i.e., the feature map 1025), 2×2 32×32 partitions (i.e., the feature map 1027), and 1×1 64×64 partition (i.e., the feature map 1029), respectively. However, in the general case, any convolutional filters of size $2^k$ can be used as long the classifiers 1018, 1020, and 1022 determine, as described, 4×4 16×16 partitions (i.e., the feature map 1025), 2×2 32×32 partitions (i.e., the feature map 1027), and 1×1 64×64 partition (i.e., the feature map 1029).

In the classifier 1018, the feature map 1025, which has a dimension of 4×4×1, is shown as being directly derived (i.e., there are no additional intervening convolution operations) from a feature maps 1034, which is of size 4×4×32. However, that need not be the case and any number of additional convolution operations can be used between the feature maps 1034 and the feature map 1025. This is illustrated by a dot-dashed line 1036. The same can be applicable to the classifiers 1020 and 1022 with respect to feature map 1027 and the feature map 1029, respectively.

In an example, a parameter can be used as a configuration parameter (i.e., a threshold parameter) of the CNN. If the number of remaining features is less than or equal to the threshold parameter, then the number of features of the next layer can be set to 1. In the example of the CNN 1000 of FIG. 10, the threshold parameter is set to 32. As such, since the number of features of the feature maps 1034 is equal to the threshold parameter (i.e., 32), then the next layer corresponds to the layer that produces the feature map 1025, which has a feature dimension of 1. In an example, each of the classifiers can be configured with a different respective threshold parameter. In another example, all the classifiers can be configured to use the same threshold parameter.

In an example, the feature map dimensionality (i.e., the last dimension of a feature maps) within a classifier can be reduced using a feature reduction parameter F. For example, a classifier can reduce the number of channels according to the progression IncomingFeature, IncomingFeature/F, IncomingFeature/$F^2$, ..., 1, where IncomingFeature is the number of features that are initially received by the layer. In an example, each of the classifiers can be configured with a different respective feature reduction parameter. In another example, all the classifiers can be configured to use the same feature reduction parameter.

The classifier 1018 is now used to illustrate the threshold parameter and the feature reduction parameter. With respect to the classifier 1018, IncomingFeature is 256 (as illustrated by the features maps 1019, which is of size 4×4×256), the feature reduction parameter F is 2, and the threshold parameter is 32. As such, the classifier 1018 reduces the number of channels according to the progression 256, 256/2, 256/$2^2$, 256/$2^3$, and 1. That is, the classifier 1018 reduces the number of channels according to the progression 256, 128, 64, 32, and 1. The classifier 1018 does not include a layer where the number of channels is 256/$2^4$ (i.e., 16) since, at the progression 256/$2^3$ (i.e., 32), the threshold parameter 32 for the number of channels is reached.

The CNN 1000 can be extended to infer partition decisions for other block sizes.

For example, an encoder may allow the smallest partition to be of size 4×4. As such, to infer partition decisions for sub-blocks of size 8×8, a branch can be added to the feature extraction layers 1003 such that each branch of the feature extraction layers 1003 can generate feature maps, each of size 4×4, as inputs to the concatenation layer 1016. Additionally, a classifier can be added between the concatenation layer 1016 and the classifier 1018. The added classifier infers (i.e., outputs) partition decisions for sub-blocks of size 8×8 of the block 1002. It is noted that the block 1002 can be partitioned into 8×8 sub-blocks, each of size 8×8. The added classifier reduces, to a size of 8×8×1, the feature maps received from the concatenation layer 1016 through a series of non-overlapping convolutions using 2×2 filters.

For example, the CNN 1000 can be configured to infer partition decisions of a 128×128 block. For the 128×128 block, a CNN can be configured to include classifiers that determine, respectively, 1 (i.e., a 1×1 output matrix) 128×128 decision (i.e., one decision corresponding to whether the block is or is not to be split), 4 (i.e., a 2×2 output matrix) 64×64 decisions, 16 (i.e., a 4×4 output matrix) 32×32 decisions, and 64 (i.e., a 8×8 output matrix) 16×16 decisions.

In some implementations, the CNN 1000 can include early termination features. For example, if the classifier 1022 infers that the block 1002 is not to be split, then processing through the classifiers 1020 and 1018 need not be continued. Similarly, if the classifier 1020 infers that none of the 32×32 sub-blocks of the block 1002 is to be split, then processing through the classifier 1020 need not be continued.

Figure 11:
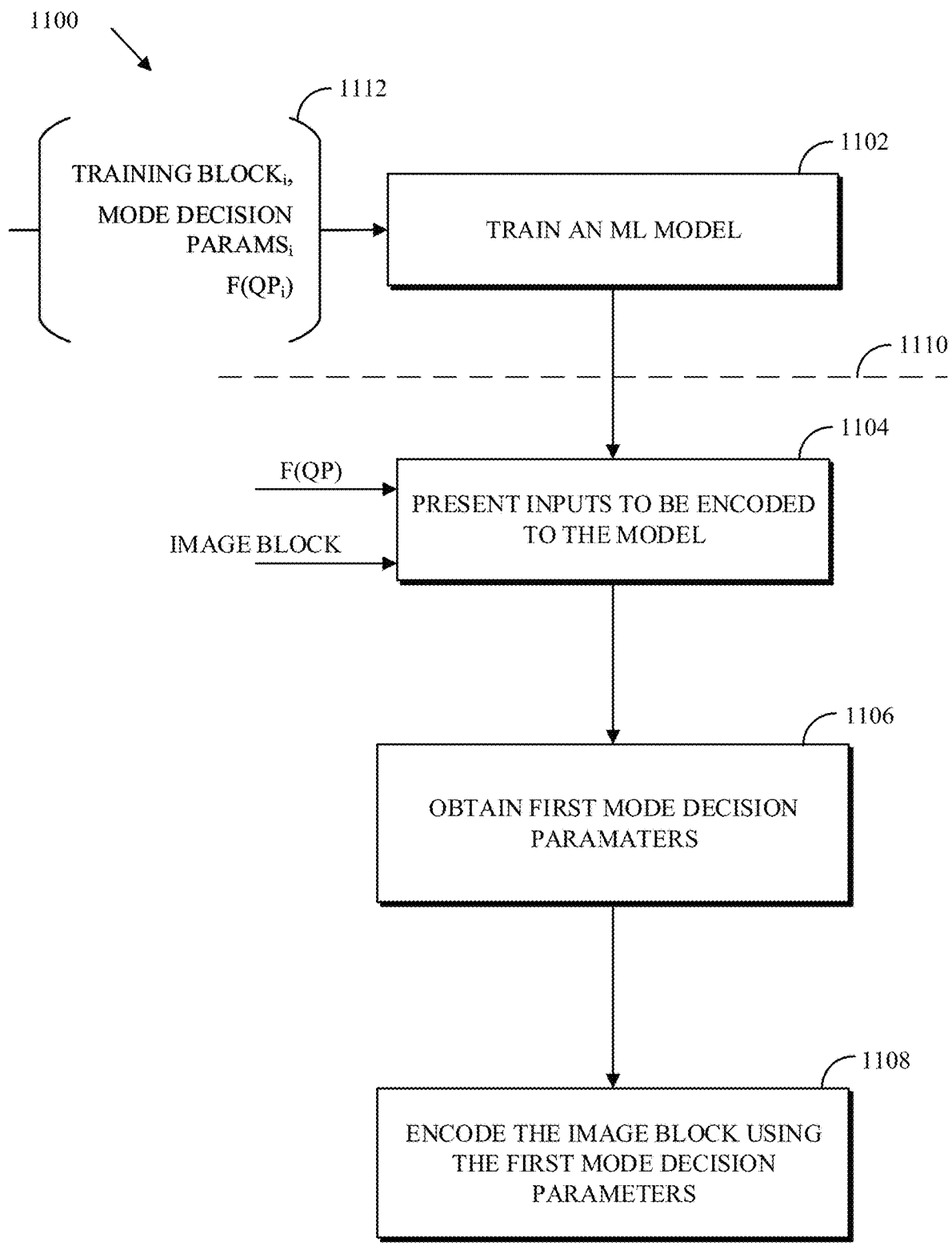
FIG. 11 is a flowchart of a process for encoding, by an encoder, an image block using a first quantization parameter according to implementations of this disclosure.

FIG. 11 is a flowchart of a process 1100 for encoding, by an encoder (i.e., a first encoder), an image block using a first quantization parameter according to implementations of this disclosure. The process 1100 trains, using input data, a machine-learning model to infer a mode decision. The process 1100 then uses the trained machine-learning model to infer a mode decision for an image block, which is to be encoded using a quantization parameter (i.e., a first quantization parameter). In an example, the mode decision can be a quad-tree partition decision of the image block. The image block can be a block of an image (e.g., a video frame) that is encoded using intra-prediction. In another example, the mode decision can be a partition that includes partitions described with respect to FIG. 16. As further described below, some of the partitions of FIG. 16 include square and non-square sub-partition; and each of the square sub-partitions can be further partitioned according to one of the partitions of FIG. 16.

At 1102, the process 1100 trains the machine-learning (ML) model. The ML model can be trained using a training data 1112. Each training datum of the training data 1112 can include a video block that was encoded by traditional encoding methods (e.g., by a second encoder), such as described with respect to FIGS. 4 and 6-9; a value (i.e., a second value) corresponding to a quantization parameter (i.e., a second quantization parameter) used by the second encoder; zero or more additional inputs corresponding to inputs used by the second encoder in determining the mode decision for encoding the video block; and the resulting mode decision determined by the second encoder. In the training phase, parameters of the ML model are generated such that, for at least some of the training data, the ML model can infer, for a training datum, the resulting mode decision of the training datum for a set of inputs that includes the video block, the value corresponding to a quantization parameter, and zero or more additional inputs of the training datum.

As described above, the second value corresponding to the second quantization parameter has a non-linear relation to the second the quantization parameter. That is, the second value is derived from the second quantization parameter based on a non-linear function of the second quantization parameter.

In an example, the non-linear function can be an exponential function of the second quantization parameter. The exponential function can be used when the second encoder is an H.264 or an HEVC encoder. For example, the non-linear function $f(Q)=c^{QP}$, where c is a constant, can be used. In an example, c=⅓. In an example, the non-linear function can be a quadratic function of the second quantization parameter. The quadratic function can be used when the second encoder is an H.263, an AV1, or a VP9 encoder. For example, the non-linear function $f(QP)=QP^\alpha$, where is α integer that is not equal to 0 or 1 (i.e., $\alpha \neq 0$ and $\alpha \neq 1$), can be used. In an example, α=2. In the general case, the non-linear function is of a same type as a function used by the second encoder for determining a multiplier used in a rate-distortion calculation, as described above.

In the case that the ML model is used to infer a relationship between blocks and respective quad-tree partitioning of the blocks, the resulting mode decision determined by the second encoder can be indicative of the quad-tree partition of the training block of the training datum. Many indications (e.g., representations) of the quad-tree partition are possible. In an example, a vector (e.g., sequence) of binary flags, as described with respect to the quad-tree 703 can be used.

In the case that the ML model is used to infer a relationship between blocks that are intra-predicted and respective quad-tree partitioning of the blocks, the zero or more additional inputs corresponding to inputs used by the second encoder in determining the mode decision for encoding the video block can include at least some of the samples (i.e., first samples) of the top neighboring block, at least some of the samples (i.e., second samples) of the left neighboring block of the input block, at least some of the samples of the top-left neighboring block, or a combination thereof. For brevity, and without loss of generality, the top-left neighboring block can be considered to be part of either the top neighboring block or the left neighboring block. As such, in an example, the first samples or the second samples can be considered to include samples from the top-left neighboring block.

During the training phase (i.e., at 1102), the ML model learns (e.g., trains, builds, derives, etc.) a mapping (i.e., a function) that accepts, as input, a block (such as the block

1002 of FIG. 10) and a non-linear value of a quantization parameter (e.g., $QP^2$ as shown in FIG. 10) and output a partitioning of the block.

During the training phase, and so that the learned function can be as useful as possible, it is preferable that the ML model be trained using a large range of input blocks and a large range of possible QP values, such as QP values that are used in representative of real-world applications.

For example, with respect to input blocks, if the training data set includes only dark (e.g., pixels having low intensity values) training blocks, then the ML model may well learn how to determine a mode decision for dark blocks but provide unreliable output when presented with non-dark blocks during the inference phase. For example, if the second encoder uses a discrete set of the QP values, then it is preferable that each of the QP values is well represented in the training data set. For example, if the QP value can vary from 0 to 1, then it is preferable that the training data include varying QP values in the range 0 to 1. If a QP value is not used (e.g., missed QP value) in the training data, then the ML model may misbehave (e.g., provide erroneous output) when the missed QP value is presented to the ML model during the inference phase. In another example, if a missed QP value (i.e., a QP value that is not used during the training phase) is used during the inference phase, the missed QP can be interpolated from QP values that are used during the training phase and the interpolated QP value can then be used during the inference phase.

The ML model can then be used by the process 1100 during an inference phase. The inference phase includes the operations 1104 and 1106. A separation 1110 indicates that the training phase and the inference phase can be separated in time. As such, the inferencing phase can be performed by a first encoder and the training data 1112 can be generated by a second encoder. In an example, the first encoder and the second encoder are the same encoder. That is, the training data 1112 can be generated by the same encoder that performs the inference phase. In either case, the inference phase uses a machine-learning model that is trained as described with respect to 1102.

At 1104, inputs are presented to ML module. That is, the inputs are presented to a module that incorporates, includes, executes, implements, and the like the ML model. The inputs include the image block (e.g., as described with respect to the block 1002 of FIG. 10) and a non-linear function of a value (i.e., a first value) corresponding to the first quantization parameter. As described above, the first value is derived (i.e., results) from the non-linear function using the first quantization parameter as input to the non-linear function. In an example, the first value can be as described with respect to $QP^2$ of FIG. 10. The inputs can also include additional inputs, as described above with respect to the zero or more additional inputs.

At 1106, the process 1100 obtains first mode decision parameters from the machine-learning model. In an example, the process 1100 obtains the first mode decision parameters as described with respect to FIG. 10. That is, for example, for the block 1002, the CNN 1000 of FIG. 10 provides an output that is indicative of a quad-tree partition of the block 1002.

At 1108, the process 1100 encodes the image block using the first mode decision parameters. That is, and continuing with the example of inferring a block partitioning, for each of the sub-blocks (i.e., according to the output that is indicative of a quad-tree partition), the process 1100 can intra-predict the block as described with respect to the intra/inter-prediction stage 402 of FIG. 4, and consistent with the description of FIG. 4, ultimately entropy encode, as described with respect to the entropy encoding stage 408, the image block in a compressed bitstream, such as the bitstream 420 of FIG. 4.

In an example, the non-linear function can be approximated by linear segments. Approximating the non-linear function by piecewise linear segments is illustrated with respect to FIG. 12.

Figure 12:
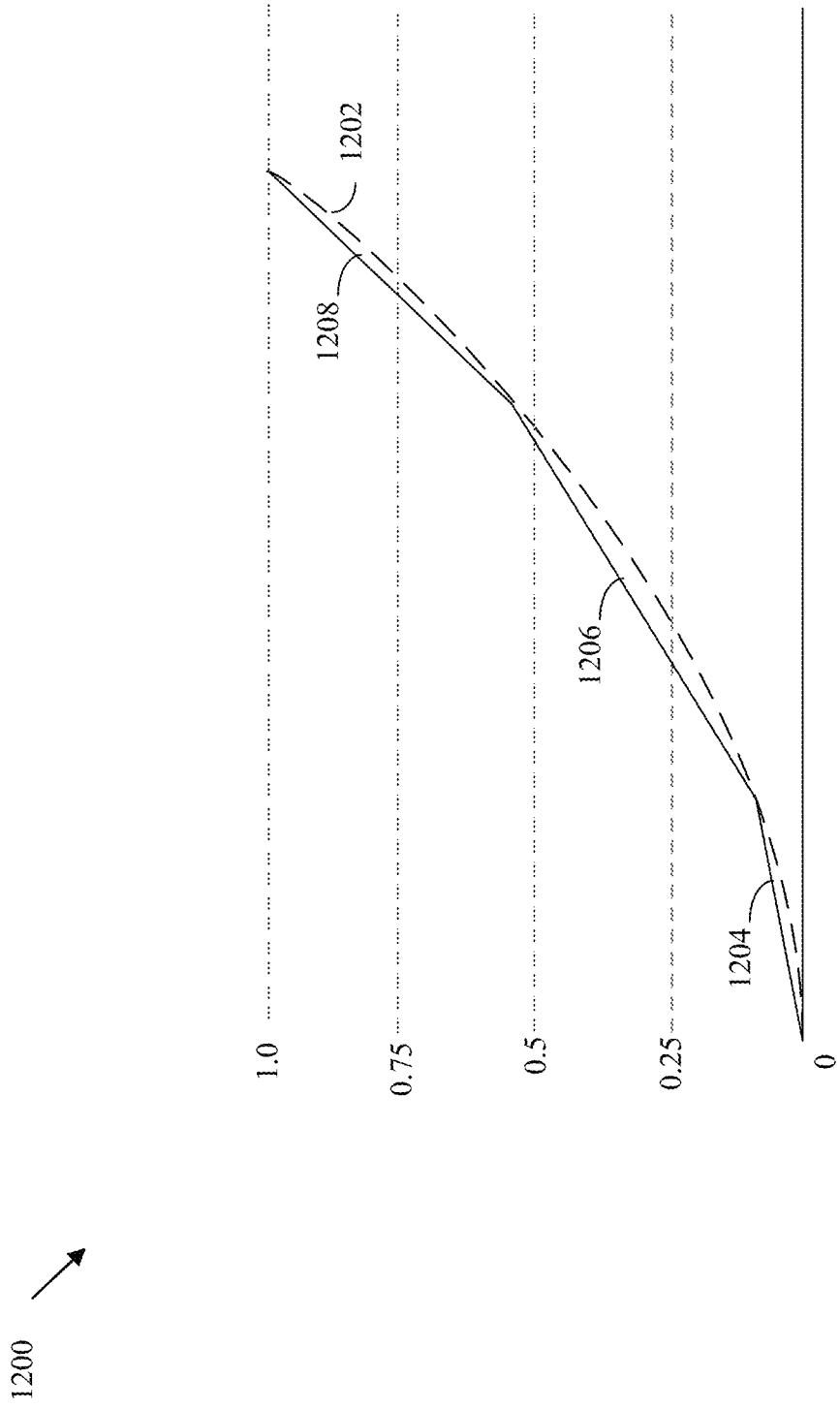
FIG. 12 is an example of approximating a non-linear function of a quantization parameter using linear segments according to implementations of this disclosure.

FIG. 12 is an example 1200 of approximating a non-linear function of a quantization parameter using linear segments according to implementations of this disclosure. A quadratic function is used to describe the non-linear function. However, as described above another non-linear function types are possible. The example 1200 shows, as a dashed curve, a non-linear function 1202 of the quantization parameter. The non-linear function 1202 is $QP^2$. In the example 1200, the QP values range from 0 to 1. The example 1200 illustrates splitting the range 0 to 1 into several segments; namely, segments 1204, 1206, and 1208. While three segments are illustrated, more or fewer, but more than 1, segments can be used.

The range 0 to 1 can be split into a first range that includes the QP values 0 to 0.25, a second range that includes the QP values 0.25 to 0.75, and a third range that includes the QP values 0.75 to 1. The segment 1204 corresponds to the function $QP_1=0.25\ QP$; the segment 1206 corresponds to the function $QP_2=QP-0.1875$; and the segment 1208 corresponds to the function $QP_3=1.75QP-0.75$. As such, which of functions $QP_1$, $QP_2$, or $QP_3$ is used to derive the second value, which is used during the training phase, and the first value, which is used during the inferencing phase, depends on the respective QP value. For example, if the first quantization parameter is 0.8, then the function $QP_3$ is used. For example, if the second quantization parameter is 0.2, then the function $QP_1$ is used.

Figure 13:
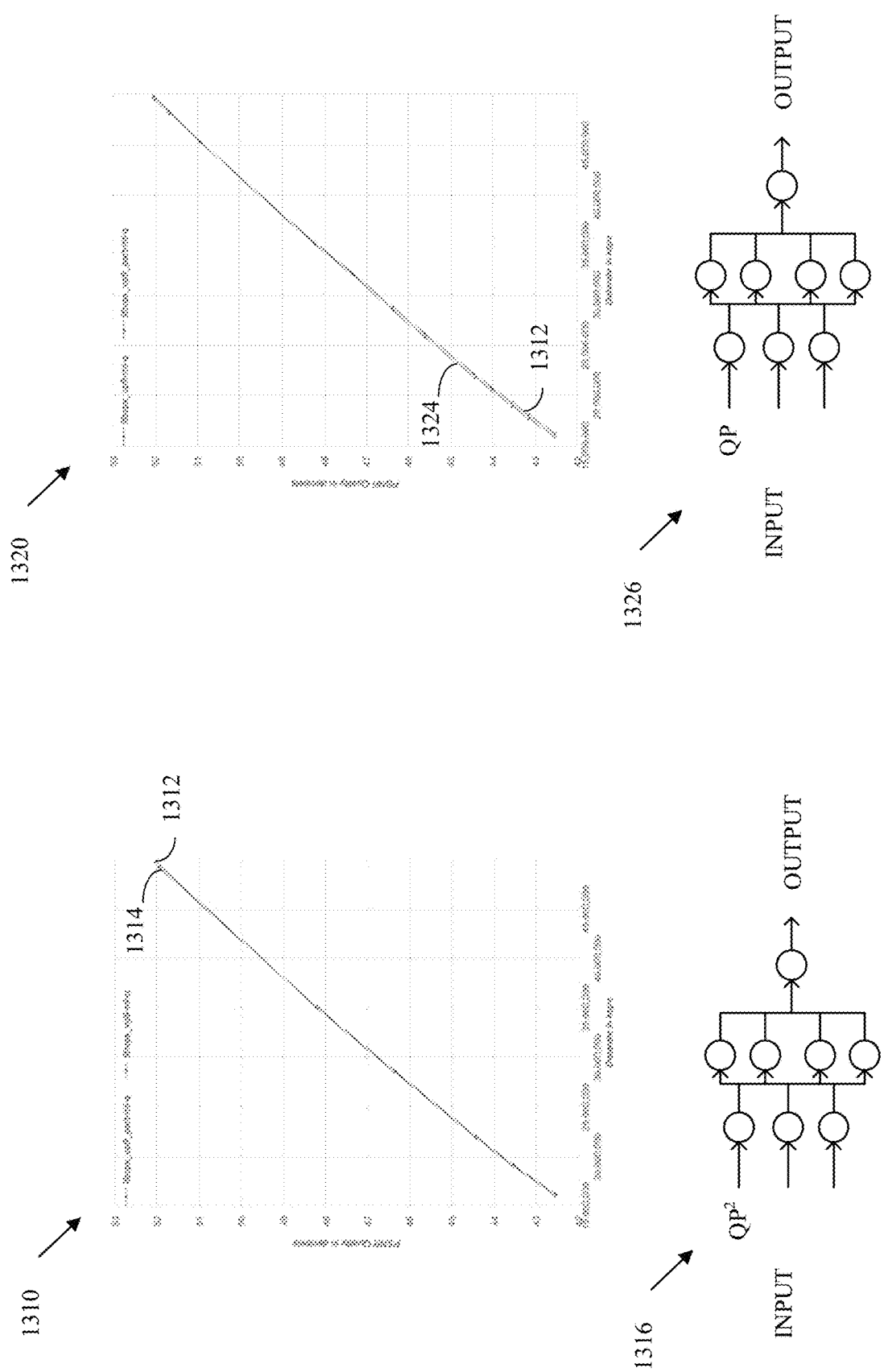
FIG. 13 is an example of a rate-distortion performance comparison of a first machine-learning model that uses as input a non-linear QP function and a second machine-learning model that uses a linear QP function.

FIG. 13 is an example 1300 of a rate-distortion performance comparison of a first machine-learning model 1316 that uses as input a non-linear QP function and a second machine-learning model 1326 that uses a linear QP function. The peak signal-to-noise ratio (PSNR) is used as the distortion metric. The results of graphs 1310 and 1320 are obtained by experimentation.

The first machine-learning model 1316 is a model of a CNN that has an architecture as described (above and below) with respect to FIG. 10. Whereas the fully connected layers of the second machine-learning model 1326 has 1.2 million parameters, the first machine-learning model 1316 (which is an all-convolutional model and does not include fully connected classification layers) is much smaller with only 300,000 parameters (using a feature compression rate of 0.5). As such, and due at least in part to the smaller model size, it is possible to perform inferring on a power- and/or capacity-constrained platform (e.g., a mobile device) using the first machine-learning model 1316. The reduced model size is due in part to each of, or the combination of, using the non-linear value of the QP (in this example, $QP^2$) and the CNN architecture, which has the receptive field conforming properties described herein.

The first machine-learning model 1316 and the second machine-learning model 1326 are depicted as generic machine-learning models with an input layer, internal layers, and an output layer. The first machine-learning model 1316 and the second machine-learning model 1326 are depicted only to illustrate that the first machine-learning model 1316 uses a non-linear function of QP, namely $QP^2$, whereas the second machine-learning model 1326 uses a linear function of QP, namely the QP value itself.

A curve 1312 of graphs 1310 and 1320 depicts the rate-distortion performance of a VP9 encoder, as described with respect to FIG. 4. That is the curve 1312 is generated based on brute-force encoding (i.e., encoding that is not based on a machine-learning model). A curve 1314 of the graph 1310 depicts the rate-distortion performance resulting from using the first machine-learning model 1316 to infer block partitions to be used in a VP9 software encoder. A curve 1324 of the graph 1320 depicts the rate-distortion performance resulting from using the second machine-learning model 1326 to infer block partitions to be used in a VP9 software encoder.

It is noted that in the graphs 1310 and 1320, higher QP values typically correspond to lower data rates. The graph 1320 shows that when using a linear function of QP, the PSNR performance degrades as the QP value increases. However, when using $QP^2$, as shown in the graph 1310, a more consistent rate-distortion performance across various QP values is obtained.

The graphs show that, on average, higher rate-distortion performance can be achieved when using $QP^2$. The performance, in BD-rate, is approximately 1.78% worse than brute-force encoding when using $QP^2$; whereas using QP, the performance is approximately 3.6% worse than brute-force encoding.

As described above with respect to 1108 of FIG. 11, an encoder that uses a machine-learning model, such as the ML model described with respect to FIG. 10, to infer mode decision parameters for image block, can encode the mode decision parameters, in a compressed bitstream, such as the bitstream 420 of FIG. 4. As mentioned above, the image block can be a superblock and the mode decision parameters can be indicative of a quad-tree partition of the superblock.

As such, a decoder, such as the decoder 500 of FIG. 5, can decode the image block using the mode decisions parameters received in the compressed bitstream.

As such, a process of decoding an image block can include receiving, in a compressed bitstream, such as the compressed bitstream 420 of FIG. 5, an indication of a quad-tree partitioning of the image block into sub-blocks; and decoding the image block using the indication of the quad-tree partitioning of the image block.

As described above with respect to FIGS. 10-11, the quad-tree partitioning can be determined by an encoder using a machine-learning model that is trained by using training data as inputs to train the machine-learning model. Each training datum can include a training block that is encoded by the encoder, mode decision parameters used by the encoder for encoding the training block, and a value corresponding to a quantization parameter. The mode decision parameters can be indicative of a quad-tree partitioning of the training block. The encoder used the quantization parameter for encoding the training block the value is the result of a non-linear function using the quantization parameter as input. As described above, the non-linear function can be of a same type as a function used by the encoder for determining a multiplier used in rate-distortion calculation.

Figure 14:
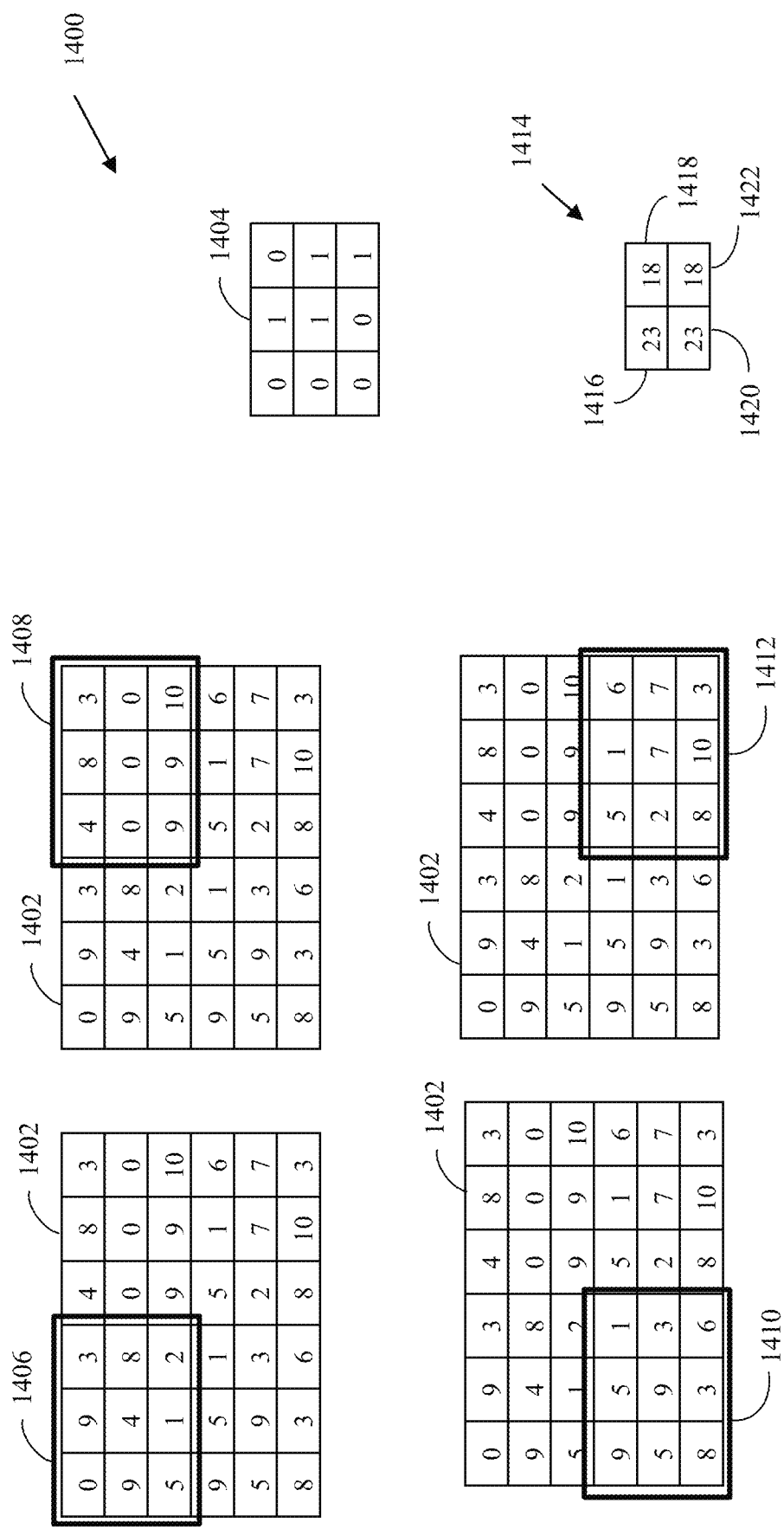
FIG. 14 is an example of a convolution filter according to implementations of this disclosure.

FIG. 14 is an example 1400 of a convolution filter according to implementations of this disclosure. The example 1400 includes a region 1402 of an image. The region 1402 is shown as a 6×6 region for the purposes of this example. However, it is to be understood that convolution filters can be applied to any size block, superblock, region of image, or an image. As mentioned with respect to FIG. 10, convolution operations can be used to generate any of the feature maps 1004, 1006, 1008, 1010, and so on.

A filter 1404 of size 3×3 is used in this example. However, filters can have different sizes. The example 1400 uses a non-overlapping convolution operation with a stride that is equal to the filter size. As such, the stride size, in each of the horizontal and vertical directions is 3. The filter 1404 is shown as including binary (i.e., zero and one) values. However, the values of a filter can by any value (e.g., positive and/or negative real values). As mentioned above, the values of a filter can be determined, by the machine-learning model, during the training phase of the machine-learning model, such as at 1102 of FIG. 11. Feature map 1414 is the output of convolving the filter 1404 with the region 1402.

The filter 1404 is first convolved (e.g., using a matrix multiplication operation) with a sub-region 1406. As such, a pixel 1416 of the feature map 1414 can be calculated as (0×0+9×1+3×+9×0+4×1+8×1+5×0+1×0+2×1)=23. The filter 1404 is then convolved with a sub-region 1408. As such, a pixel 1418 can be calculated as (4×0+8×1+3×0+0×0+0× 1+0×1+9×0+9×0+10×1)=18. The filter 1404 is then convolved with a sub-region 1410. As such, a pixel 1420 can be calculated as (9×+5×1+1×0+5×0+9×1+3×1+8×0+3×0+6× 1)=23. The filter 1404 is then convolved with a sub-region 1412. As such, a pixel 1422 can be calculated as (5×0+1× 1+6×0+2×0+7×1+7×1+8×0+10×0+3×1)=18.

Figure 15:
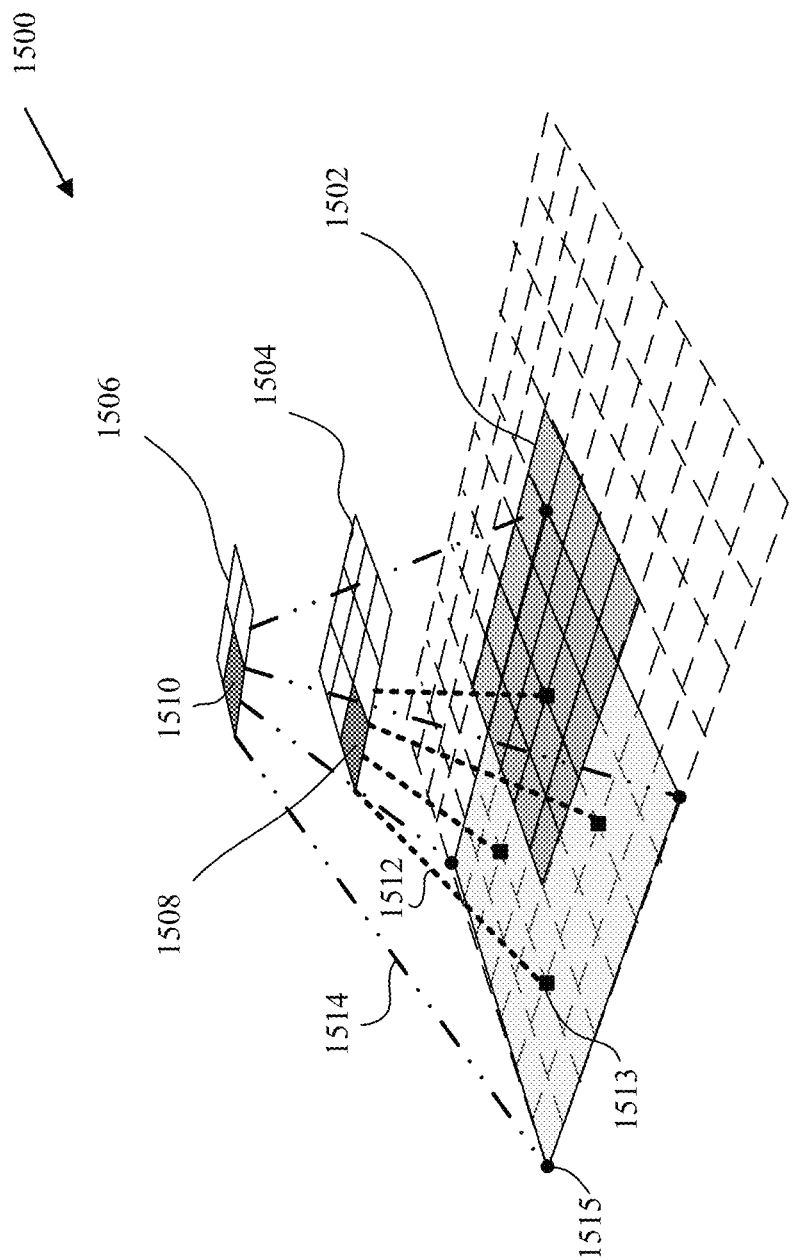
FIG. 15 is an example of receptive fields according to implementations of this disclosure.

FIG. 15 is an example 1500 of receptive fields according to implementations of this disclosure. The example 1500 includes an input 1502. The example 1500 and the explanation herein are adapted from Dang Ha The Hien,. 'A guide to receptive field arithmetic for Convolutional Neural Networks,' April, 2017, [retrieved on Aug. 6, 2018]. Retrieved from the Internet <URL: https://medium.com/mlreview/ a-guide-to-receptive-field-arithmetic-for-convolutional- neural-networks-e0f514068807>.

The input 1502 can be a portion of an image for which it is desirable to extract features (e.g., a feature map). The input 1502 can be, for example, the block 702, one of the blocks 702-1, 702-2, 702-3, and 702-4, or one of the 702-5, 702-6, 702-7, and 702-8. The input 1502 is shown as having a size of 5×5 pixels. However, the size of the input 1502 is not pertinent to the description of the concept of a receptive field.

The example 1500 illustrate convolution operations that use filters of size k=3×3, a padding size p=1×1, and a stride s=2×2. Description of the concepts of padding, stride, and kernel (i.e., filter) size are omitted herein as such concepts are well known to a person skilled in the art. An example of a filter of size k=3×3 is illustrated with respect to the filter 1404 of FIG. 14.

The example 1500 illustrates a first feature map 1504 that is the result of convolving the input 1502 with a first filter and a second feature map 1506 that is the result of convolving the first feature map with a second filter. The first filter and the second filter can have different values. In machine learning, the values of the filters can be determined (e.g., learned) during the training phase.

A pixel 1508 (which may also be referred to as a feature) of the first feature map 1504 results from the convolution of pixels of the input 1502. Such pixels are the receptive field of the pixel 1508. Note that, in the example 1500, since the convolution uses padding, some of the pixels (e.g., the padded pixels) used for generating the pixel 1508 are outside of the input. The receptive field of the pixel 1508 is defined by a square whose corners are marked by black squares, such as a black square 1513. Short-dash lines, such as a short-dash line 1512, and emanating from the corners of the pixel 1508 also illustrate the receptive field of the pixel 1508. The end points of the short-dash lines are the back squares.

A pixel 1510 (which may also be referred to as a feature) of the second feature map 1506 results from the convolution of pixels of the first feature map 1504. Such pixels are the receptive field of the pixel 1510 in the first feature map 1504 and can be further projected onto the input 1502 to determine receptive field in the input 1502. Note that, in the example 1500, since the convolution uses padding, some of the pixels used for generating the pixel 1510 are outside of the first feature map 1504. The padding pixels of the first feature map 1504 are not shown so as to not further clutter FIG. 15. The receptive field of the pixel 1510 in the input 1502 is defined by a square whose corners are marked by black circles, such as a black circle 1515. Two-dot-dash lines, such as a two-dot-dash line 1514, emanating from the corners of the pixel 1510 also illustrate the receptive field in the input 1502 of the pixel 1510. The end points of the two-dot-dash lines are the back circles.

As can be seen, and as can be appreciated, the receptive field can play an important role in image analysis during video encoding. The receptive field of a series of convolution layers can be interpreted as the "region" of the image (e.g., a block, a superblock, a frame, or any other portion of an image) that each pixel (e.g., feature) "sees" (e.g., influenced by, summarizes, etc.) when computing the pixel (e.g., feature).

Pixels at the initial input layer (e.g., the input 1502) become features (via a series of convolutions) for later layers (e.g., the second layer, which includes the second feature map 1506) of a CNN that will aid the CNN analyze the initial input layer.

When using a CNN to analyze a model for determining partitioning using quadtree representations, as described herein, it can be critical that each analysis region becomes confined to the boundaries of its quadtree representation. That is, for example, it can be critical that features describing a region of an image, and which are used for inferring a partitioning of the region of the image, do not mix pixels from other regions of the image. That is, for example and referring to FIG. 7, it can be critical that features describing the blocks 702-2 and/or the blocks 702-5, 702-6, 702-7, and 702-8 not include, in their respective fields, pixels from any of the blocks 702-1, 702-3, or 702-4.

The following four equations can be used to calculate the receptive field in each layer of a CNN.

$$n_{out} = \left\lfloor \frac{n_{in} + 2p - k}{s} \right\rfloor + 1 \quad (1)$$

$$j_{out} = j_{in} \times s \quad (2)$$

$$r_{out} = r_{in} + (k - 1) \times j\_in \quad (3)$$

$$start_{out} = start_{in} + \left(\frac{k-1}{2} - p\right) \times j\_in \quad (4)$$

$n_{out}$ is the number of output features in a layer. In the example 1500, a first layer corresponds to (e.g., includes) the first feature map 1504 and a second layer corresponds to (e.g., includes) the second feature map 1506. $n_{in}$ is the number of input features to the layer. For example, the number of input features to the second layer is the number of features in the first feature map 1504, namely 9. k, p, and s (collectively referred to as the convolution properties) are, respectively, the convolution kernel size, the convolution padding size, and the convolution stride size.

Equation (1) calculates the number of output features of a layer based on the number of input features and the convolution properties. Equation (2) calculates a distance (i.e., a jump $j_{out}$) between two adjacent features in the output feature map. Equation (3) calculates the receptive field size (i.e., $r_{out}$) of the output feature map, which is define as the area that is covered by k input features and the extra area that is covered by the receptive field of the input feature that on the border. Equation (4) calculates the center position (i.e., star $t_{out}$) of the receptive field of the first output feature (e.g., the pixel 1508 and the pixel 1510 correspond, respectively, to the first output feature in the first feature map 1504 and the second feature map 1506).

Having described the concept of receptive field, FIG. 10 is referred to again to describe additional features of the CNN 1000 of FIG. 10. First, it is noted that the CNN 1000 is an all-convolutional network. That is, the feature extraction and the classification layers use convolution operations. Whereas, as described above, a typical CNN includes fully connected layers for classification, the CNN 1000 uses convolution layers for classification.

In the feature extraction layers (i.e., the feature extraction layers 1003), non-overlapping convolution operations are performed on the input at each layer by setting the stride value the same as the kernel size. In the feature extraction layers, each convolutional layer uses a 2×2 kernel, with the stride of 2. This non-overlapping convolution operation ensures that, at the last feature extraction layer (i.e., immediately before the concatenation layer 1016), each one of the N×N channels (i.e., feature maps of size N×N), where N=8 in the example of FIG. 10, only sees (e.g., uses, is affected by, etc.) information from its corresponding sub-block of size (64/N)×(64/N), where 64×64, in the example of FIG. 10, corresponds to the size of the block 1002 (i.e., the input block). In an example, N can be $2^k$.

In the classification layers (i.e., the layers of each of the classifiers 1018, 1020, and 1022), instead of fully connected layers, convolution reduction with 1×1 kernels are performed until the number of desired outputs is reached. Convolutional layers are used in the classification layers. As such, the receptive fields are respected (e.g., preserved). For example, in the CNN 1000, in order to infer partition decisions (i.e., by the classifier 1018) for sub-blocks of size 16×16 (i.e., as the feature map 1025, which is the output of the classifier 1018), non-overlapping convolution operations (i.e., between the concatenation layer 1016 and the first layer of the classifiers 1018) with a kernel size 2 are performed to reduce the number of channels from 8×8 (i.e., the size of each of the feature maps of the concatenation layer 1016 as described above) to 4×4 (i.e., the size of each of the feature maps 1019), and from then on apply kernel size 1×1 and gradually reduce the feature dimension size to 1 (i.e., the feature map 1025, which is of size 4×4×1). The output of the last classification layer is 4×4×1, which is the partition determination of the 16 sub-blocks of the input 1002. Each of the 16 sub-blocks is of size 16×16 pixels.

Similarly, the partition decision for each of the 32×32 sub-blocks can be inferred by the classifiers 1020; and the partition of the 64×64 block can be inferred by the classifiers 1022.

As a person skilled in the art recognizes, a kernel of size 1×1 can be used to reduce the dimensionality of feature maps. For example, an input (e.g., the feature maps 1034, which is of size 4×4×32) of size 4×4 with 32 feature maps, when convolved with 1 filter of size 1×1 would result in a feature map (e.g., the feature maps 1025) of size of 4×4×1. As such, a kernel of size 1×1 can be used to pool (e.g., combine) information from multiple feature maps.

A kernel of size 1×1, as used herein, does not mix values from different locations of the input. That is, for example, when determining the value at location (x, y) of the feature map 1025, only the 32 values at the location (x, y) of the each of the 32 maps of the feature maps 1034 are used. As such, by using 1×1 convolutions, the receptive fields can be preserved (e.g., respected).

The advance in the state of the art (of analyzing image data, such as to determine a block partitioning) is provided by the combination of using non-overlapping kernel sizes with an all-convolutional network (for feature extraction and for classification) that respects receptive fields. The kernel sizes can be even number (i.e., multiples of 2).

For simplicity, the CNN 1000 is described for determining a partitioning of a 64×64 block (i.e., the block 1002) from a 64×64 partition (using the classifier 1022) down to whether (using the classifier 1018) each 16×16 sub-block should be further partitioned into 8×8 blocks. However, the disclosure herein is not so limited. A CNN architecture according to implementations of the disclosure can be generalized as follows.

A convolutional neural network (CNN) for determining a block partitioning in video coding, where the block is of size N×N (e.g., 64×64, 128×128) and where a smallest partition determined by the CNN is of size S×S (e.g., 4×4, 8×8), can include feature extraction layers (e.g., feature extraction layers 1003), a concatenation layer (e.g., the concatenation layer 1016), and classifiers (e.g., the classifiers 1018, 1020, 1022). The classifiers include all-convolutional layers. Other values of N and S can be possible. In some examples, N can be 32, 64, or 128, and S can be 4, 8, or 16.

The concatenation layer receives, from the feature extraction layers, first feature maps of the block. Each first feature map is of size S×S (e.g., 8×8). The first feature maps can be as described with respect to the feature maps 1004, 1008, and 1014 of FIG. 10.

Each of the classifiers includes one or more classification layers. Each classification layer receives second feature maps having a respective feature dimension. For example, and referring to FIG. 10, the classifier 1018 includes 5 classification layers (illustrated by the 5 squares representing the feature maps of each layer) the classifier 1020 includes 4 classification layers, and the classifier 1022 includes 3 classification layers.

Each of the classifiers can be configured to infer a partition decision for sub-blocks of a specific size. That is, a classifier can be configured to infer partition decisions for sub-blocks of size (αS)×(αS) of the block, where α is a power of 2 and α=2, . . . , N/S. As such, when N=64 and S=8, a can have any of the values 2, 4, and 8. For example, with respect to the classifier 1018, α=2 and the classifier 1018 infers partition decisions for blocks of size (2×8)×(2×8)=16×16; with respect to the classifier 1020, α=4 and the classifier 1018 infers partition decisions for blocks of size (4×8)×(4×8)=32×32; and with respect to the classifier 1022, α=8 and the classifier 1018 infers partition decisions for blocks of size (8×8)×(8×8)=64×64.

A classifier can infer partition decisions for sub-blocks of size (αS)×(αS) of the block by instructions that include applying, at each successive classification layer of the classification layers, a kernel of size 1×1 to reduce the respective feature dimension in half; and outputting by a last layer of the classification layers an output corresponding to a N/(αS)×N/(αS)×1 output map. That is, and using the classifier 1022 as an example where α=8, the classifier 1022 convolves the feature maps 1023 with 32 kernels, each of size 1×1, thereby resulting in feature maps 1031, which have dimensions of 1×1×32. The feature map 1029 (which is of size N/(αS)×N/(αS)×1=64/(8×8)×64/(8×8)×1=1×1×1) corresponds to the decision whether the block of size N×N should be split or not.

The first classifier (e.g., the classifiers 1018 of FIG. 10), can receive the first feature maps from the concatenation layer (e.g., the concatenation layer 1016) and apply a first non-overlapping convolution operation using a first 2×2 kernel to reduce the first feature maps to a size of (S/2)×(S/2). For example, as described with respect to the classifier 1018, the first layer of the classifier 1018 receives the 8×8 feature maps from the concatenation layer 1016 and reduces them to the size of 4×4 (i.e., the feature maps 1019). In the example of the classifier 1018, the feature maps 1019 is shown as having a dimension of 256. However, that need not be the case so long as the dimension of the last layer of each of the classifiers is N/(αS)×N/(αS)×1.

The feature maps 1019 is shown, for illustration purposes, as including a feature dimensionality of 256. However, that need not be the case. The number of feature maps received at the first layer of each classifier can be configurable. Kernel sizes that obey the rule kernel=stride size=($2^k$, $2^k$), for some k, can be used.

In a case where N neighboring rows and N neighboring columns are included in input to the first layer, such that the block 1002 is of size (64+N)×(64×N), (128+N×128+N), etc., a kernel of size ($2^k$+N, $2^k$+N) and a stride size of ($2^k$, $2^k$) can be used to propagate the N left/top information and observe (e.g., preserve) the perception field.

The CNN includes a second classifier that infers partition decisions for sub-blocks of size (βS)×(βS). For example, the second classifier can be the classifier 1022 of FIG. 10. As such, β=8. The second classifier can receive third feature maps, each of size M×M, from a third classifier. The third classifier can be the classifier 1020. As such, M=2 and the third feature maps can be the features maps 1021. The second classifier can apply a second non-overlapping convolution operation using a second 2×2 kernel to reduce the third feature maps to a size of (M/2)×(M/2). For example, the classifier 1022 receives the features maps 1021 from the classifier 1020 and applies a second non-overlapping convolution operation using a second 2×2 kernel to generate the feature maps 1023.

While outputs of the classification layers are described as matrices of the form B×B×1 (e.g., 4×4×1, 2×2×1, or 1×1×1), it is to be understood that a classification layers outputs B*B=$B^2$ values, such that each of the outputs $B^2$ corresponds to a cartesian location in the matrix. Each of the output values corresponds a block location and can be a value indicating whether a sub-block at that location should be partitioned or not. For example, a value of 0 can indicate that the sub-block is not to be partitioned and a value of 1 can indicate that the sub-block is to be partitioned. Other values are, of course, possible.

The feature extraction layers can include a first feature extraction layer that applies an (N/S)×(N/S) non-overlapping convolutional filter to the block to generate a first subset of the first feature maps of the block. For example, the first feature extraction layer can be the feature extraction layer 1003-A, which applies a (64/8)×(64/8)=8×8 non-overlapping convolutional filter to the block 1002 to generate the feature maps 1004.

The feature extraction layers can further include a second feature extraction layer that is configured to apply an M×M non-overlapping convolutional filter to the block to generate maps each of size (N/M)×(N/M), where M is less than S, is greater than 1, and is a power of 2; and successively apply non-overlapping 2×2 convolutional filters to the maps to generate a second subset of the first feature maps of the block. The feature extraction layers 1003-B and 1003-C can be examples of the second feature extraction layer.

As described above, a non-linear value of a quantization parameter (QP) can be used as an input to the CNN. In FIG. 10, the non-linear value of QP is shown as an input to the concatenation layer 1016. However, that need not be the case and the non-linear value of the QP can be used as an input to other layers of the CNN. For example, the non-linear value of the QP can be used as the input to at least one of the classification layers.

As mentioned above, a CNN that is configured as described above can be used by an encoder, such as the encoder 400 of FIG. 4, to infer a block partitioning. As such, the block partitioning is not derived by brute force methods as are known in the art. In an example, the CNN can be used by the intra/inter-prediction stage 402.

Subsequent to inferring the block partitioning, an encoder can predict the blocks of the partitions using known prediction techniques, such as inter-prediction, intra-prediction, other techniques, or a combination thereof.

Figure 7:
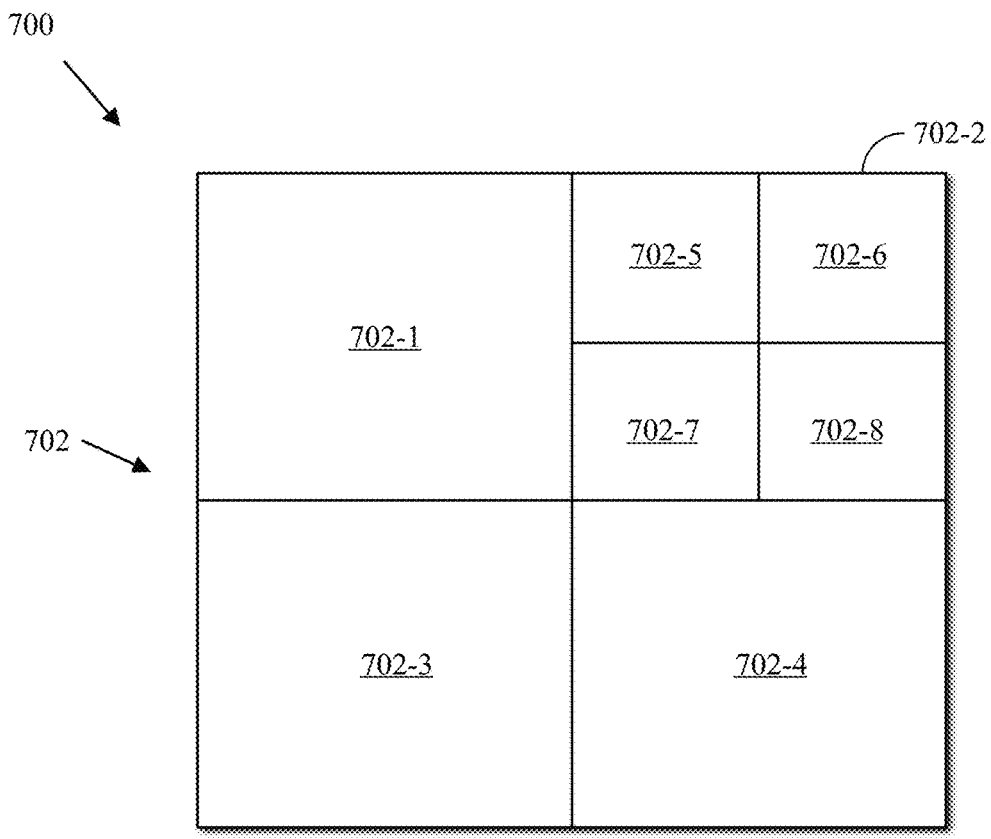
FIG. 7 is a block diagram of an example of a quad-tree representation of a block according to implementations of this disclosure.
Figure 7:
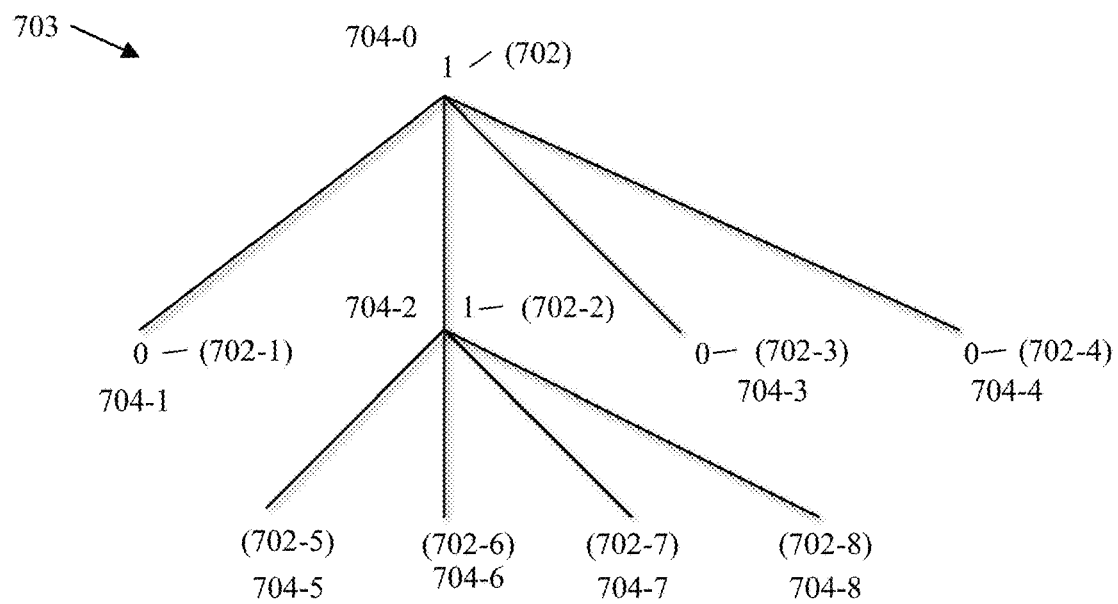

As is known in the art, a quad-tree, such as described with respect to FIG. 7, can be output in a compressed bitstream, such as the bitstream 420 of FIG. 4. A decoder, such as the decoder 500 of FIG. 5, can decode from the compressed bitstream the quad-tree in the process of decoding a block (i.e., a superblock). As such, the quad-tree can be determined (e.g., inferred) in the encoder using a CNN that is configured as described above and output in the compressed bitstream. As such, a decoder decodes, from the compressed bitstream, the quad-tree, which was inferred by the CNN that is configured as described with respect to FIG. 10.

Figure 16:
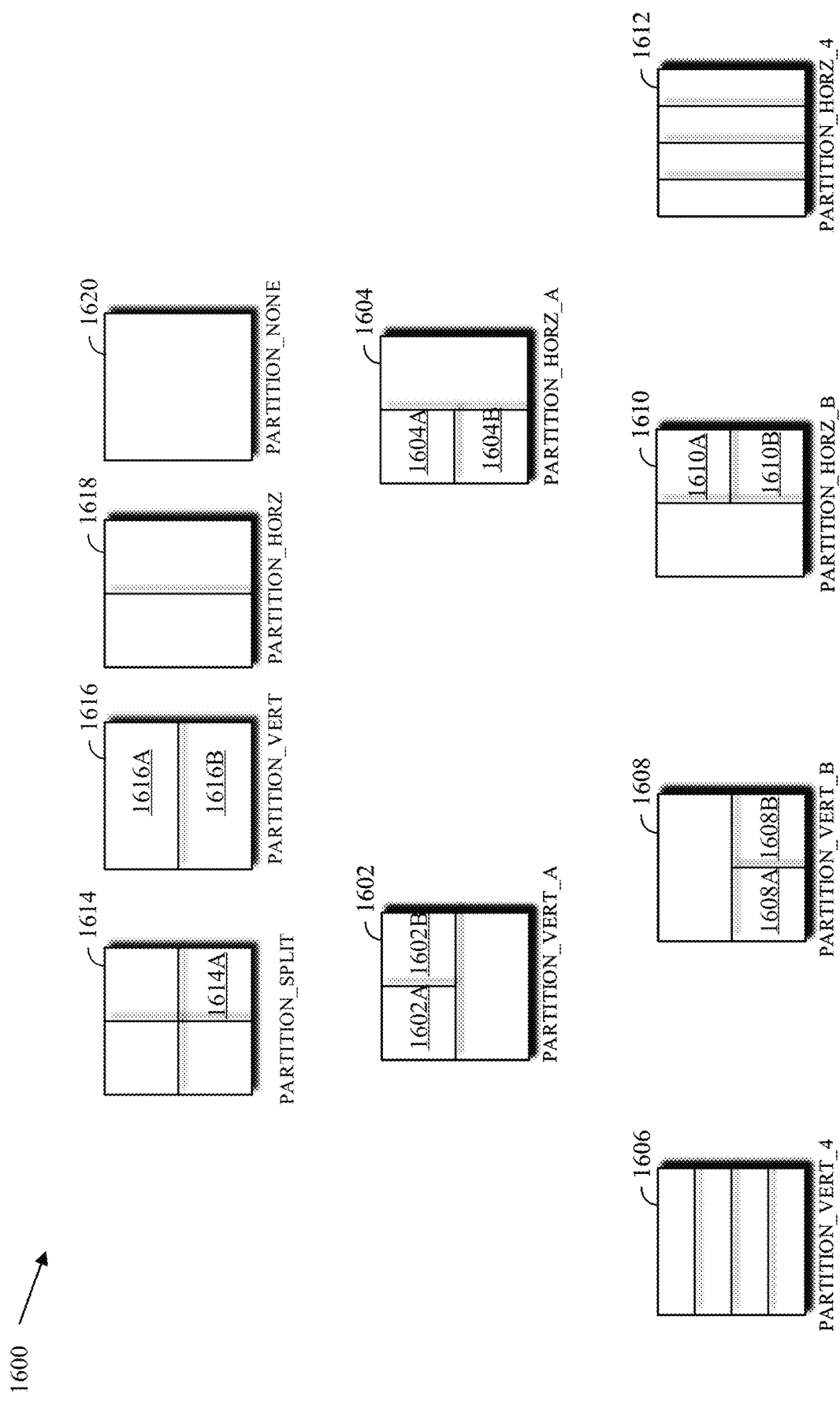
FIG. 16 is an example of non-square partitions of a block.

While inferring a quad-tree partition of a block is described, a CNN according to implementations of this disclosure can be used to infer non-square partitions that may or may not be represented by a quad-tree. That is, for example, a non-square partition can correspond to an internal node of the quad-tree having a number of children that is greater than or equal to two children. FIG. 16 is an example 1600 of non-square partitions of a block. Some encoders may partition a superblock, such as a super-block of size 64×64, 128×128, or any other size, of a square sub-block of the superblock, into one of the partitions of the example 1600.

A partition type 1602 (which may be referred to as the PARTITION_VERT_A) splits an N×N coding block into two horizontally adjacent square blocks, each of size N/2×N/2, and a rectangular prediction unit of size N×N/2. A partition type 1608 (which may be referred to as the PARTITION_VERT_B) splits an N×N coding block into a rectangular prediction unit of size N×N/2 and two horizontally adjacent square blocks, each of size N/2×N/2.

A partition type 1604 (which may be referred to as the PARTITION_HORZ_A) splits an N×N coding block into two vertically adjacent square blocks, each of size N/2×N/2, and a rectangular prediction unit of size N/2×N. A partition type 1610 (which may be referred to as the PARTITION_HORZ_B) splits an N×N coding block into a rectangular prediction unit of size N/2×N and two vertically adjacent square blocks, each of size N/2×N/2.

A partition type 1606 (which may be referred to as the PARTITION_VERT_4) splits an N×N coding block into four vertically adjacent rectangular blocks, each of size N×N/4. A partition type 1612 (which may be referred to as the PARTITION_HORZ_4) splits an N×N coding block into four horizontally adjacent rectangular blocks, each of size N/4×N.

As is known, other partition types can be used by a codec. The example 1600 illustrates four partition types that may be available at an encoder. A partition type 1614 (also referred to herein as the PARTITION_SPLIT partition type and partition-split partition type) splits an N×N coding block into four equally sized square sub-blocks. For example, if the coding block 1614 is of size N×N, then each of the four sub-blocks of the PARTITION_SPLIT partition type, such as a sub-block 1616A, is of size N/4×N/4.

A partition type 1616 (also referred to herein as the PARTITION_VERT partition type) splits the coding block into two adjacent rectangular prediction units, each of size N×N/2. A partition type 1618 (also referred to herein as the PARTITION_HORZ partition type) splits the coding block into two adjacent rectangular prediction units, each of size N/2×N. A partition type 1620 (also referred to herein as the PARTITION_NONE partition type and partition-none partition type) uses one prediction unit for the coding block such that the prediction unit has the same size (i.e., N×N) as the coding block.

The partition types 1614-1620 are referred to herein as basic partition types and the partitions 1602-1612 are referred to herein as extended partition types.

A partition can be represented by a tree. A tree can be represented by a vector. Let P denote the set of all valid partitions (or, equivalently, the respective representations of the partitions). Accordingly, a CNN can be trained to infer a mapping into the set P. Configuring a CNN to infer the partitions described with respect to FIG. 16 includes defining an appropriate set P and using appropriate training data.

Assuming that there are N possible outcomes, then there are N*M possible decisions (in an example, M=21 and N=4) for simplicity, and each p(n, j) can be combined by a softmax function, so that sum(n in range(N)) p(n, j)==1 for some any j.

For example, in the case of VP9, which uses a coding unit size of 64×64 and the four basic partition types, for quadtree partitions only, there are, and as described above, 21 decisions corresponding to one 64×64, four 32×32, and 16 16×16 decisions (i.e., 1+4+16=21 decisions). In a case where a CNN is used to also determine non-quadtree partitions, then there are 21*4=84 possible decisions, where 21 corresponds to the quadtree partitions and 4 corresponds to the basic partition types; namely, PARTITION_SPLIT, PARTITION_VERT, PARTITION_HORZ, and PARTITION_NONE.

For example, in the case of AV1, which uses a coding unit size of 128×128 and the basic and extended partitions types (for a total of 10 partition types), for quadtree partitions only, there are 85 decisions (corresponding to, 1 128×128, 4 64×64, 16 32×32, and 64 16×16=1+4+16+64=85 decisions) per partition type. In a case where a CNN is used to also determine non-quadtree partitions, then there are 850 decisions (corresponding to 85 decisions multiplied by 10 partition types=850 decisions).

For simplicity of explanation, the processes 800 and 1100 are each depicted and described as a series of blocks, steps, or operations. However, the blocks, steps, or operations in accordance with this disclosure can occur in various orders and/or concurrently. Additionally, other steps or operations not presented and described herein may be used. Further-more, not all illustrated steps or operations may be required to implement a technique in accordance with the disclosed subject matter.

The aspects of encoding and decoding described above illustrate some encoding and decoding techniques. However, it is to be understood that "encoding" and "decoding," as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as being preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise or clearly indicated otherwise by the context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special-purpose computer/processor, which can contain other hardware for carrying out any of the methods, algorithms, or instructions described herein, can be utilized.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other transmitting station 102 and receiving station 106 implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. An apparatus for encoding a block of a picture, comprising:
   a convolutional neural network (CNN) for determining a block partitioning of the block, the block having an N×N size and a smallest partition determined by the CNN being of size S×S, the CNN comprising:
      feature extraction layers;
      a concatenation layer that receives, from the feature extraction layers, first feature maps of the block, wherein each first feature map of the first feature maps is of the smallest possible partition size S×S of the block, and wherein the concatenation layer receives no feature map that is not of the smallest possible partition size S×S; and
      at least one classifier that is configured to infer partition decisions for sub-blocks of size (αS)×(αS) of the block, wherein α is a power of 2.

2. The apparatus of claim 1, wherein the at least one classifier comprises classification layers, wherein each classification layer receives second feature maps having a respective feature dimension.

3. The apparatus of claim 2, wherein to infer the partition decisions comprises to:
   apply, at some of successive classification layers of the classification layers, a kernel to reduce the respective feature dimension; and
   output by a last layer of the classification layers an output corresponding to a N/(αS)×N/(αS)×1 output map.

4. The apparatus of claim 3, wherein the kernel is of size 1×1 and the respective feature dimension is reduced in half.

5. The apparatus of claim 1, the apparatus configured to:
   encode, in a compressed bitstream, the block according to the partition decisions.

6. The apparatus of claim 1, wherein the at least one classifier includes a first classifier that infers partition decisions for sub-blocks of size (2S)×(2S), the first classifier is configured to:
  receive the first feature maps from the concatenation layer; and
  apply a first non-overlapping convolution operation using a first 2×2 kernel to reduce the first feature maps to a size of (S/2)×(S/2).

7. The apparatus of claim 6, wherein the at least one classifier includes a second classifier that infers partition decisions for sub-blocks of size (βS)×(βS), the second classifier being different from the first classifier and is configured to:
  receive third feature maps, each of size M×M, from a third classifier; and
  apply a second non-overlapping convolution operation using a second 2×2 kernel to reduce the third feature maps to a size of (M/2)×(M/2).

8. The apparatus of claim 1, wherein a non-linear value of a quantization parameter (QP) is used as an input to the CNN.

9. The apparatus of claim 8, wherein the non-linear value of the QP is used as the input to at least one of the concatenation layer or the at least one classifier.

10. The apparatus of claim 1, wherein the partition decisions corresponding to partitions comprising a partition_split, a partition_vert, a partition_horz, a partition_none, a partition_vert_a, and a partition_horiz_a partitions.

11. The apparatus of claim 1, wherein the partitions further comprise a partition_vert_4, a partition_vert_b, a partition_horz_b, and a partition_horz_4 partitions.

12. A method of encoding a block, comprising:
  obtaining, using a convolutional neural network (CNN), partition decisions for sub-blocks of size (αS)×(αS) of the block, by steps comprising:
    obtaining first feature maps from feature extraction layers of the CNN;
    inputting the first feature maps to a concatenation layer of the CNN, wherein each first feature map of the first feature maps is of a smallest possible partition size S×S of the block, and wherein the concatenation layer receives no feature map that is not of the smallest possible partition size S×S; and
    obtaining the partition decisions from classifiers of the CNN, wherein each classifier of the classifiers infers partition decisions for sub-blocks of size (αS)×(αS) of the block for a respective value of α, wherein α is a power of 2; and
  encoding the block in a compressed bitstream according to the partition decisions.

13. The method of claim 12, wherein the classifiers include classification layers, wherein each classification layer receives second feature maps having a respective feature dimension.

14. The method of claim 13, wherein obtaining the partition decisions from classifiers of the CNN comprises:
  applying, at some of successive classification layers of the classifiers, a kernel to reduce the respective feature dimension; and
  outputting by a last layer of the classification layers an output corresponding to a N/(αS)×N/(αS)×1 output map.

15. The method of claim 14, wherein the kernel is of size 1×1 and the respective feature dimension is reduced in half.

16. The method of claim 12, wherein the classifiers includes a first classifier that infers partition decisions for sub-blocks of size (2S)×(2S), the method further comprises:
  receiving, by the first classifier, the first feature maps from the concatenation layer; and
  applying, by the first classifier, a first non-overlapping convolution operation using a first 2×2 kernel to reduce the first feature maps to a size of (S/2)×(S/2).

17. The method of claim 16, wherein the classifiers further include a second classifier that infers partition decisions for sub-blocks of size (βS)×(βS), the second classifier being different from the first classifier, further comprising:
  receiving, by the second classifier, third feature maps, each of size M×M, from a third classifier; and
  applying, by the second classifier, a second non-overlapping convolution operation using a second 2×2 kernel to reduce the third feature maps to a size of (M/2)×(M/2).

18. The method of claim 12, wherein a non-linear value of a quantization parameter (QP) is used as an input to the CNN.

19. The method of claim 18, wherein the non-linear value of the QP is used as the input to at least one of the concatenation layer or at least one classifier of the classifiers.

20. An apparatus for decoding a block, comprising:
  a processor configured to:
    decode, from a compressed bitstream, partition decisions for the block; and
    decode the block according to the partition decisions, wherein an encoder encoded the partition decisions in the compressed bitstream using a convolutional neural network (CNN) that inferred the partition decisions, the encoder performing:
      obtaining, using the CNN, the partition decisions for sub-blocks of size (αS)×(αS) of the block, by steps comprising:
        obtaining feature maps from feature extraction layers of the CNN;
        inputting the feature maps to a concatenation layer of the CNN, wherein each feature map of the feature maps is of a smallest possible partition size S×S of the block, and wherein the concatenation layer receives no feature map that is not of the smallest possible partition size S×S; and
        obtaining the partition decisions from classifiers of the CNN, wherein each classifier of the classifiers infers partition decisions for sub-blocks of size (αS)×(αS) of the block for a respective value of α, wherein α is a power of 2.

* * * * *